US009516606B2

(12) United States Patent
Ouchi et al.

(10) Patent No.: US 9,516,606 B2
(45) Date of Patent: Dec. 6, 2016

(54) TERMINAL APPARATUS, METHOD, AND INTEGRATED CIRCUIT

(71) Applicant: Sharp Kabushiki Kaisha, Osaka-shi, Osaka (JP)

(72) Inventors: Wataru Ouchi, Osaka (JP); Shoichi Suzuki, Osaka (JP); Tatsushi Aiba, Osaka (JP); Hiroki Takahashi, Osaka (JP); Kazunari Yokomakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/783,528

(22) PCT Filed: Jul. 16, 2014

(86) PCT No.: PCT/JP2014/068957
§ 371 (c)(1),
(2) Date: Oct. 9, 2015

(87) PCT Pub. No.: WO2015/008804
PCT Pub. Date: Jan. 22, 2015

(65) Prior Publication Data
US 2016/0066282 A1 Mar. 3, 2016

(30) Foreign Application Priority Data

Jul. 19, 2013 (JP) .................................. 2013-150099

(51) Int. Cl.
| | |
|---|---|
| *H04B 7/00* | (2006.01) |
| *H04W 52/26* | (2009.01) |
| *H04W 52/28* | (2009.01) |
| *H04L 5/00* | (2006.01) |
| *H04W 72/04* | (2009.01) |

(52) U.S. Cl.
CPC .............. *H04W 52/262* (2013.01); *H04L 5/00* (2013.01); *H04W 52/28* (2013.01); *H04W 72/0413* (2013.01); *H04W 72/0473* (2013.01)

(58) Field of Classification Search
CPC ................... H04W 72/0413; H04W 72/0406; H04W 72/1284; H04W 24/10; H04W 52/146; H04W 72/042; H04W 52/262; H04W 72/0473
USPC ............. 455/522, 69, 68, 127.1, 127.2, 509, 455/508, 450, 452.1, 515, 507, 67.11, 455/550.1, 422.1, 403, 445, 426.1, 426.2; 370/329, 341, 328, 330, 336, 318, 252
See application file for complete search history.

(56) References Cited

U.S. PATENT DOCUMENTS

2011/0250899 A1\* 10/2011 Vajapeyam ........... H04W 52/40
455/450

OTHER PUBLICATIONS

Ericsson et al., "On standardization impact of TDD UL-DL adaptation," 3GPP TSG-RAN WG1 #69, R1-122016, May 21-25, 2012, pp. 1-3.

(Continued)

*Primary Examiner* — Keith Ferguson
(74) *Attorney, Agent, or Firm* — Keating & Bennett, LLP

(57) ABSTRACT

In a terminal apparatus communication with a base station apparatus, transmit power for a PUSCH transmission is set based on a beta offset in a case where a delta MCS is enabled. In regard to control data sent via the PUSCH without the UL-SCH data in subframes belonging to a first subframe set, a value of the beta offset is based on third information. In regard to the control data sent via the PUSCH without the UL-SCH data in subframes belonging to a second subframe set, the value of the beta offset is based on fourth information.

5 Claims, 19 Drawing Sheets

(56) References Cited

OTHER PUBLICATIONS

Ericsson et al., "Signalling support for dynamic TDD", 3GPP TSG-RAN WG1 #72, R1-130558, Jan. 28-Feb. 1, 2013, 3 pages.

"3rd Generation Partnership Project; Technical Specification Group Radio Access Network; Evolved Universal Terrestrial Radio Access (E-UTRA); Physical layer procedures (Release 11)," 3GPP TS 36.213 V11.2.0, Feb. 2013, pp. 1-173.

* cited by examiner

FIG. 7

| UPLINK-DOWNLINK CONFIGURATION | DOWNLINK-TO-UPLINK SWITCH-POINT PERIODICITY | SUBFRAME NUMBERS | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG. 9

| CONDITION | UPLINK REFERENCE UL-DL CONFIGURATION | DOWNLINK REFERENCE UL-DL CONFIGURATION |
|---|---|---|
| (a) | D | D |
| (b) | U | U OR D |
| (c) | S | S OR D |

FIG. 10

| CONDITION | UPLINK REFERENCE UL-DL CONFIGURATION | DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U OR D |
| (g) | S | S | S |
| (h) | S | D | S OR D |

FIG. 11

| UPLINK REFERENCE UL-DL CONFIGURATION | DOWNLINK REFERENCE UL-DL CONFIGURATION | TRANSMISSION DIRECTION UL-DL CONFIGURATION |
|---|---|---|
| 0 | 0 | - (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | - (1) |
| 1 | 2 | 1, 2 |
| 1 | 4 | 1, 4 |
| 1 | 5 | 1, 2, 4, 5 |
| 2 | 2 | - (2) |
| 2 | 5 | 2, 5 |
| 3 | 3 | - (3) |
| 3 | 4 | 3, 4 |
| 3 | 5 | 3, 4, 5 |
| 4 | 4 | - (4) |
| 4 | 5 | 4, 5 |
| 5 | 5 | - (5) |
| 6 | 6 | - (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 12

| UPLINK-DOWNLINK CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 |  | 4 | 6 |  |  | 4 | 6 |  |  |  |
| 1 |  |  | 6 |  | 4 |  | 6 |  |  | 4 |
| 2 |  |  |  | 4 |  |  |  |  | 4 |  |
| 3 | 4 |  |  |  |  |  |  |  | 4 | 4 |
| 4 |  |  |  |  |  |  |  |  | 4 | 4 |
| 5 |  |  |  |  |  |  |  |  | 4 |  |
| 6 | 7 | 7 |  |  |  | 7 | 7 |  |  | 5 |

FIG. 13

| UPLINK-DOWNLINK CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 |  | 7 | 4 |  |  | 7 | 4 |  |  |  |
| 1 |  |  | 4 |  |  | 6 |  | 4 |  | 6 |
| 2 |  |  |  | 6 |  |  |  |  | 6 |  |
| 3 | 6 |  |  |  |  |  |  |  | 6 | 6 |
| 4 |  |  |  |  |  |  |  |  | 6 | 6 |
| 5 |  |  |  |  |  |  |  |  | 6 |  |
| 6 | 6 | 4 |  |  |  | 7 | 4 |  |  | 6 |

FIG. 14

| UPLINK-DOWNLINK CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UPLINK-DOWNLINK CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 16

| CQI INDEX | MODULATION | CODING RATE × 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 17

| VALUE OF CSI REQUEST FIELD | $\beta_{offset}^{PUSCH}$ |
|---|---|
| '000' | — |
| '001' | FIRST VALUE CONFIGURED BY HIGHER LAYER |
| '010' | SECOND VALUE CONFIGURED BY HIGHER LAYER |
| '011' | THIRD VALUE CONFIGURED BY HIGHER LAYER |
| '100' | FOURTH VALUE CONFIGURED BY HIGHER LAYER |
| '101' | FIFTH VALUE CONFIGURED BY HIGHER LAYER |
| '110' | SIXTH VALUE CONFIGURED BY HIGHER LAYER |
| '111' | SEVENTH VALUE CONFIGURED BY HIGHER LAYER |

FIG. 18

| VALUE OF CSI REQUEST FIELD | TRIGGERED APERIODIC CSI | $\beta_{offset}^{PUSCH}$ |
|---|---|---|
| '000' | APERIODIC CSI REPORT IS NOT TRIGGERED | — |
| '001' | APERIODIC CSI REPORT OF COMBINATION OF "CSI PROCESS AND/OR SUBFRAME SET" OF SERVING CELL c CONFIGURED BY HIGHER LAYER IS TRIGGERED | FIRST VALUE CONFIGURED BY HIGHER LAYER |
| '010' | APERIODIC CSI REPORT FOR FIRST SET OF "CSI PROCESS AND/OR SUBFRAME SET" CONFIGURED BY HIGHER LAYER IS TRIGGERED | SECOND VALUE CONFIGURED BY HIGHER LAYER |
| '011' | APERIODIC CSI REPORT FOR SECOND SET OF "CSI PROCESS AND/OR SUBFRAME SET" CONFIGURED BY HIGHER LAYER IS TRIGGERED | THIRD VALUE CONFIGURED BY HIGHER LAYER |
| '100' | APERIODIC CSI REPORT FOR THIRD SET OF "CSI PROCESS AND/OR SUBFRAME SET" CONFIGURED BY HIGHER LAYER IS TRIGGERED | FOURTH VALUE CONFIGURED BY HIGHER LAYER |
| '101' | APERIODIC CSI REPORT FOR FOURTH SET OF "CSI PROCESS AND/OR SUBFRAME SET" CONFIGURED BY HIGHER LAYER IS TRIGGERED | FIFTH VALUE CONFIGURED BY HIGHER LAYER |
| '110' | APERIODIC CSI REPORT FOR FIFTH SET OF "CSI PROCESS AND/OR SUBFRAME SET" CONFIGURED BY HIGHER LAYER IS TRIGGERED | SIXTH VALUE CONFIGURED BY HIGHER LAYER |
| '111' | APERIODIC CSI REPORT FOR SIXTH SET OF "CSI PROCESS AND/OR SUBFRAME SET" CONFIGURED BY HIGHER LAYER IS TRIGGERED | SEVENTH VALUE CONFIGURED BY HIGHER LAYER |

TERMINAL APPARATUS, METHOD, AND INTEGRATED CIRCUIT

TECHNICAL FIELD

The present invention relates to a terminal apparatus, a method, and an integrated circuit.

Priority is claimed on Japanese Patent Application No. 2013-150099, filed Jul. 19, 2013, the content of which is incorporated herein by reference.

BACKGROUND ART

Radio access schemes and radio networks (hereinafter referred to as a long term evolution (LTE) or an evolved universal terrestrial radio access (EUTRA)) of cellular mobile communication have been examined in the 3rd Generation Partnership Project (3GPP). In the LTE, a base station apparatus is referred to as an evolved NodeB (eNodeB) and a terminal apparatus is referred to as user equipment (UE). The LTE is a cellular communication system in which a plurality of areas covered by base station apparatuses are arranged in cell forms. A single base station apparatus may manage a plurality of cells.

The LTE may correspond to time division duplex (TDD). The LTE adopting a TDD mode is referred to as a TD-LTE or LTE TDD. The TDD is a technology for enabling full duplex communication at a signal frequency band by performing time division multiplexing on an uplink signal and a downlink signal.

The 3GPP have examined that traffic adaptation technologies and interference management and traffic adaptation (IMTA) technologies are applied to the TD-LTE. A traffic adaption technology is a technology for changing a ratio between an uplink resource and a downlink resource according to an uplink traffic and a downlink traffic. The traffic adaptation technology is also referred to as a dynamic TDD.

In NPL 1, a method of using a flexible subframe is suggested as a method of realizing traffic adaptation. A base station apparatus can receive an uplink signal or transmit a downlink signal in a flexible subframe. In NPL 1, a terminal apparatus regards a flexible subframe as a downlink subframe unless the terminal apparatus receives an indication to transmit an uplink signal in the flexible subframe from the base station apparatus.

NPL 1 discloses that a hybrid automatic repeat request (HARQ) timing with respect to a physical downlink shared channel (PDSCH) is determined based on newly introduced uplink-downlink configuration and an HARQ timing with respect to a physical uplink shared channel (PUSCH) is determined based on initial UL-DL configuration.

NPL 2 discloses that (a) UL/DL reference configuration is introduced and (b) some subframes can be scheduled for either of an uplink and a downlink via dynamic grant/assignment from a scheduler.

In section 7.2 of NPL 3, a procedure of terminal apparatuses for reporting of channel state information (CSI) is described. A base station apparatus allocates downlink resources to the terminal apparatuses based on the channel state information reported from the plurality of terminal apparatuses. The channel state information includes a channel quality indicator (CQI).

CITATION LIST

Non-Patent Document

[Non-Patent Document 1] "on standardization impact of TDD UL-DL adaptation", R1-122016, Ericsson, ST-Ericsson, 3GPP TSG-RAN WG1 Meeting #69, Prague, Czech Republic, 21 to 25 May 2012

[Non-Patent Document 2] "Signalling support for dynamic TDD", R1-130558, Ericsson, ST-Ericsson, 3GPP TSG-RAN WG1 Meeting #72, St Julian's, Malta, 28th Jan. to 1 Feb. 2013

[Non-Patent Document 3] "3GPP TS36.213 v11.2.0 (2013-02)", February, 2013

DISCLOSURE OF THE INVENTION

Problems to be Solved by the Invention

In the foregoing radio communication system, however, technologies for the uplink control information have not been sufficiently examined. The present invention is devised in view of the foregoing circumstance and an object of the present invention is to provide a terminal apparatus, a base station apparatus, a communication method, and an integrated circuit capable of performing efficient communication in a radio communication system in which uplink control information is used.

Means for Solving the Problems

To achieve the foregoing object, the present invention has contrived the following means. That is, according to an aspect of the present invention, there is provided a terminal apparatus which communicates with a base station apparatus, which receives first information indicating that a delta modulation and coding scheme (MCS) is enabled, second information indicating subframes of a first subframe set and subframes of a second subframe set, third information regarding a beta offset, and fourth information regarding the beta offset, and which sets transmit power for transmission with a physical uplink shared channel based on the beta offset in a case in which the delta MCS is enabled. In regard to control data sent via the physical uplink shared channel without uplink shared channel (UL-SCH) data in the subframes belonging to the first subframe set, a value of the beta offset is based on the third information. In regard to the control data sent via the physical uplink shared channel without the UL-SCH data in the subframes belonging to the second subframe set, the value of the beta offset is based on the fourth information. In regard to the control data sent via the physical uplink shared channel with the UL-SCH data, the value of the beta offset is 1.

According to another aspect of the present invention, there is provided a method used in a terminal apparatus communicating with a base station apparatus. The method comprises: a step of receiving first information indicating that a delta modulation and coding scheme (MCS) is enabled, second information indicating subframes of a first subframe set and subframes of a second subframe set, third information regarding a beta offset, and fourth information regarding the beta offset; a step of setting transmit power for transmission with a physical uplink shared channel on the basis of the beta offset in a case where the delta MCS is enabled; a step of configuring a value of the beta offset in regard to control data sent via the physical uplink shared channel without uplink shared channel (UL-SCH) data in the subframes belonging to the first subframe set on the basis of the third information; a step of configuring the value of the beta offset in regard to the control data sent via the physical uplink shared channel without the UL-SCH data in the subframes belonging to the second subframe set on the basis of the fourth information; and a step of configuring 1 as the value of the beta offset in regard to the control data sent via the physical uplink shared channel with the UL-SCH data.

According to still another aspect of the present invention, there is provided an integrated circuit mounted on a terminal apparatus communicating with a base station apparatus. The integrated circuit causes the terminal apparatus to fulfill a series of functions including: a function of receiving first information indicating that a delta modulation and coding scheme (MCS) is enabled, second information indicating subframes of a first subframe set and subframes of a second subframe set, third information regarding a beta offset, and fourth information regarding the beta offset; a function of setting transmit power for a physical uplink shared channel transmission on the basis of the beta offset in a case where the delta MCS is enabled; a function of configuring a value of the beta offset in regard to control data sent via the physical uplink shared channel without uplink shared channel (UL-SCH) data in the subframes belonging to the first subframe set on the basis of the third information; a function of configuring the value of the beta offset in regard to the control data sent via the physical uplink shared channel without the UL-SCH data in the subframes belonging to the second subframe set on the basis of the fourth information; and a function of configuring 1 as the value of the beta offset in regard to the control data sent via the physical uplink shared channel with the UL-SCH data.

Effects of the Invention

According to the aspects of the present invention, a terminal apparatus and a base station apparatus can efficiently communicate in a radio communication system in which uplink control information is used.

BRIEF DESCRIPTION OF THE DRAWINGS

FIG. 7 is a table illustrating an example of uplink-downlink configuration according to the embodiment.

FIG. 9 is a diagram illustrating a relation between the subframe indicated by the uplink reference UL-DL configuration and the subframe indicated by the downlink reference UL-DL configuration according to the embodiment.

FIG. 10 is a diagram illustrating a relation between the subframe indicated by the uplink reference UL-DL configuration, the subframe indicated by the downlink reference UL-DL configuration, and the subframe indicated by transmission direction UL-DL configuration according to the embodiment.

FIG. 11 is a diagram illustrating a relation between the uplink reference UL-DL configuration, the downlink reference UL-DL configuration, and the transmission direction UL-DL configuration according to the embodiment.

FIG. 12 is a diagram illustrating correspondence between subframe n in which PDCCH/EPDCCH/PHICH are arranged and subframe n+k in which PUSCHs corresponding to the PDCCH/EPDCCH/PHICH are arranged according to the embodiment.

FIG. 13 is a diagram illustrating correspondence between subframe n in which PHICH is arranged and subframe n-k in which PUSCH corresponding to the PHICH is arranged according to the embodiment.

FIG. 14 is a diagram illustrating correspondence between subframe n in which PUSCH is arranged and subframe n+k in which PHICH corresponding to the PUSCH is arranged according to the embodiment.

FIG. 15 is a diagram illustrating correspondence between subframe n-k in which PDSCH is arranged and subframe n in which HARQ-ACK corresponding to the PDSCH is transmitted according to the embodiment.

FIG. 16 is a table illustrating a modulation scheme and a coding rate corresponding to a CQI index according to the embodiment.

FIG. 17 is a diagram illustrating examples of offsets corresponding to values of CSI request fields according to the embodiment.

FIG. 18 is a diagram illustrating examples of triggered aperiodic CSIs and offsets corresponding to the values of the CSI request fields according to the embodiment.

MODE FOR CARRYING OUT THE INVENTION

Hereinafter, an embodiment of the present invention will be described.

In the embodiment, terminal apparatuses are configured in a plurality of cells. A technology for enabling a terminal apparatus to perform communication via a plurality of cells is referred to as cell aggregation or carrier aggregation. The present invention may also be applied to each of the plurality of cells configured in the terminal apparatuses. The present invention may also be applied to some of the plurality of configured cells. A cell configured in a terminal apparatus is also referred to as a serving cell.

The plurality of configured serving cells comprise one primary cell and one or a plurality of secondary cells. The primary cell is a serving cell in which an initial connection establishment procedure is performed, a serving cell in which a connection re-establishment procedure starts, or a cell which is indicated as a primary cell in a handover procedure. When or after RRC connection is established, the secondary cells may be configured.

A time division duplex (TDD) scheme is applied to a radio communication system according to the embodiment. In the case of the cell aggregation, the TDD scheme may be applied to all of the plurality of cells. In the case of the cell aggregation, cells to which the TDD scheme is applied and cells to which a frequency division duplex (FDD) scheme is applied may be aggregated. When the cells to which the TDD is applied and the cells to which the FDD is applied are aggregated, the present invention can be applied to the cells to which the TDD is applied.

The terminal apparatus transmits information indicating combinations of bands in which the carrier aggregation are supported by the terminal apparatus to a base station apparatus. The terminal apparatus transmits, to the base station apparatus, information indicating whether simultaneous transmission and reception are supported in the plurality of serving cells in a plurality of different bands in regard to each of the combinations of the bands.

In the embodiment, "X/Y" includes meanings of "X or Y". In the embodiment, "X/Y" includes meanings of "X and Y". In the embodiment, "X/Y" includes meanings of "X and/or Y".

Figure 1:
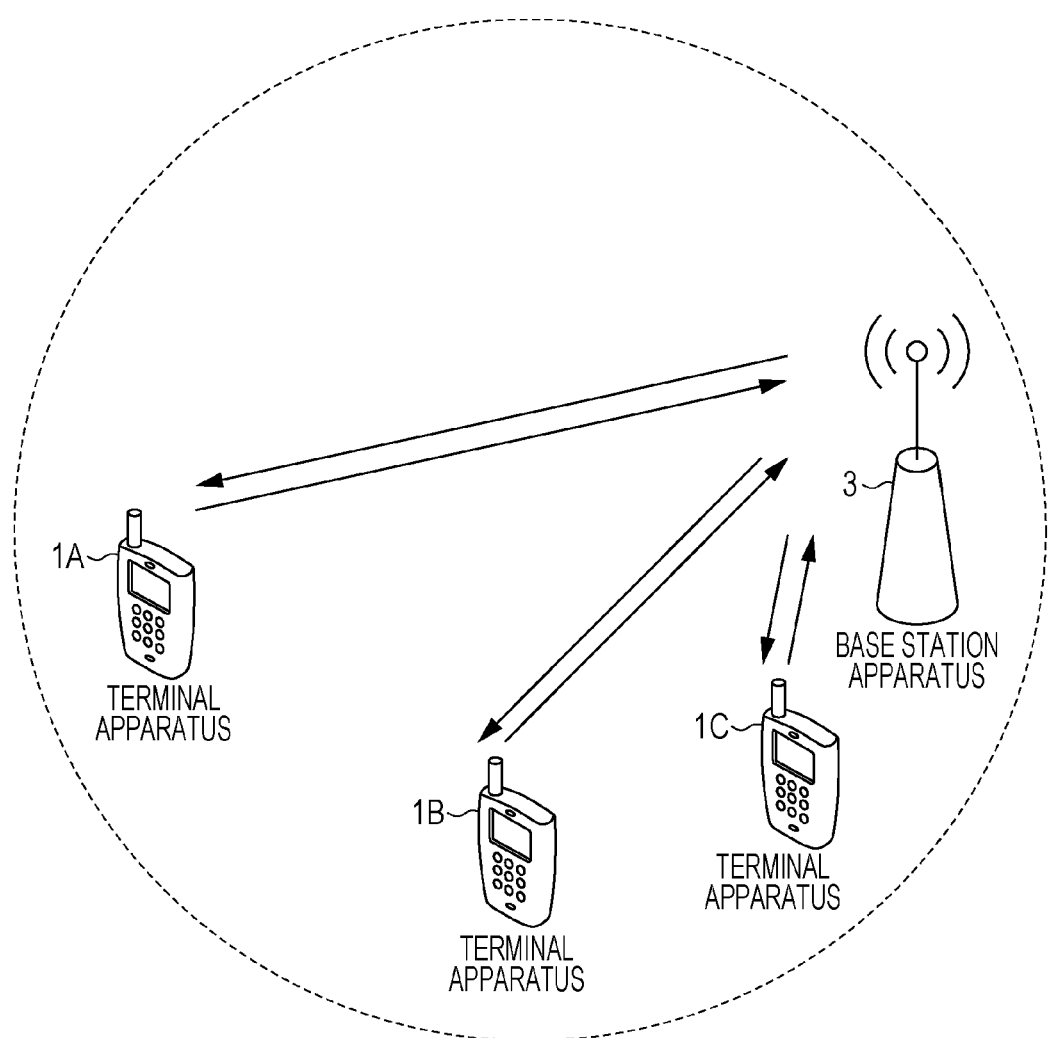
FIG. 1 is a conceptual diagram illustrating a radio communication system according to an embodiment.

FIG. 1 is a conceptual diagram illustrating a radio communication system according to an embodiment. In FIG. 1, the radio communication system includes terminal apparatuses 1A to 1C and a base station apparatus 3. Hereinafter, the terminal apparatuses 1A to 1C are referred to as the terminal apparatuses 1.

Physical channels and physical signals according to the embodiment will be described.

In FIG. 1, the following uplink physical channels are used in uplink radio communication from the terminal apparatus 1 to the base station apparatus 3. The uplink physical channels are used to transmit information output from higher layers.

Physical Uplink Control Channel (PUCCH)
Physical Uplink Shared Channel (PUSCH)
Physical Random Access Channel (PRACH)

The PUCCH is a physical channel that is used to carry uplink control information (UCI). The uplink control information includes channel state information (CSI) of a downlink, a scheduling request (SR) indicating a request for a PUSCH resource, and acknowledgement (ACK)/negative ACK (NACK) to downlink data (TB: Transport block, DL-SCH: Downlink-Shared Channel). The ACK/NACK is referred to as HARQ-ACK, HARQ feedback, or acknowledgement information.

The PUSCH is a physical channel that is used to carry an uplink data (UL-SCH: uplink-shared channel). The PUSCH may also be used to carry HARQ-ACK and/or channel state information along with the uplink data. The PUSCH may be used to carry only the channel state information or only the HARQ-ACK and the channel state information.

The PRACH is a physical channel that is used to carry a random access preamble. A main purpose of the PRACH is that the terminal apparatus 1 takes time-domain synchronization with the base station apparatus 3. Further, the PRACH is also used to indicate an initial connection establishment procedure, a handover procedure, a connection re-establishment procedure, synchronization (timing adjustment) for uplink transmission, and a request for PUSCH resources.

In FIG. 1, the following uplink physical signal is used in the uplink radio communication. The uplink physical signal is not used to transmit information output from a higher layer, but is used in the physical layer.

Uplink Reference Signal (UL RS)

In the embodiment, the following two types of uplink reference signals are used.

Demodulation Reference Signal (DMRS)
Sounding Reference Signal (SRS)

The DMRS is associated with transmission of the PUSCH or the PUCCH. The DMRS is subjected to time-domain multiplexing with the PUSCH or the PUCCH. The base station apparatus 3 uses the DMRS to perform channel correction of the PUSCH or the PUCCH. Hereinafter, transmission of both of the PUSCH and the DMRS is simply referred to as transmission of the PUSCH. Hereinafter, transmission of both of the PUCCH and the DMRS is simply referred to as transmission of the PUCCH.

The SRS is not associated with the transmission of the PUSCH or the PUCCH. The base station apparatus 3 uses the SRS to measure an uplink channel state.

In FIG. 1, the following downlink physical channels are used in downlink radio communication from the base station apparatus 3 to the terminal apparatus 1. The downlink physical channels are used to transmit information output from higher layers.

Physical Broadcast Channel (PBCH)
Physical Control Format Indicator Channel (PCFICH)
Physical Hybrid automatic repeat request Indictor Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used to carry a master information block (MIB, broadcast channel: BCH) used commonly in the terminal apparatuses 1. The MIB is transmitted at intervals of 40 ms and the MIB is repeatedly transmitted at a period of 10 ms. Specifically, initial transmission of the MIB is performed in subframe 0 of a radio frame satisfying SFN mod4=0 and retransmission (repetition) of the MIB is performed in subframe 0 of all of the other radio frames. A system frame number (SFN) is a radio frame number. The MIB is system information. For example, the MIB includes information indicating the SFN.

The PCFICH is used to transmit information indicating a domain (OFDM symbol) used to transmit the PDCCH.

The PHICH is used to carry an HARQ indicator (HARQ feedback, acknowledgement information) indicating ACK (ACKnowledgement) or NACK (Negative ACKnowledgement) to uplink data (Uplink shared Channel: UL-SCH) received by the base station apparatus 3. For example, when the terminal apparatus 1 receives the HARQ indicator indicating ACK, the corresponding uplink data is not retransmitted. For example, when the terminal apparatus 1 receives the HARQ indicator indicating NACK, the corresponding uplink data is retransmitted. The single PHICH is used to carry the HARQ indicator for single uplink data. The base station apparatus 3 transmits the HARQ indicators for a plurality of pieces of uplink data included in the same PUSCH using the plurality of PHICH.

The PDCCH and the EPDCCH are used to carry downlink control information (DCI). The downlink control information is referred to as a DCI format. The downlink control information includes downlink grant and uplink grant. The downlink grant is also referred to as downlink assignment or downlink allocation.

The downlink grant is used for scheduling of the single PDSCH in a single cell. The downlink grant is used for scheduling of the PDSCH in the same subframe as a subframe in which the downlink grant is transmitted. The uplink grant is used for scheduling of the single PUSCH in a single cell. The uplink grant is used for scheduling of the single PUSCH in a subframe located by four subframes later than a subframe in which the uplink grant is transmitted.

A cyclic redundancy check (CRC) parity bit is added to the DCI format. The CRC parity bit is scrambled with a cell-radio network temporary identifier (C-RNTI) or a semipersistent scheduling cell-radio network temporary identifier (SPS C-RNTI). The C-RNTI and the SPS C-RNTI are identifiers used to identify a terminal apparatus in a cell.

The C-RNTI is used to control the PDSCH or the PUSCH in a single subframe. The SPS C-RNTI is used to periodically allocate the resources of the PDSCH or the PUSCH.

The PDSCH is used to carry downlink data (downlink shared channel: DL-SCH).

The PMCH is used to carry multicast data (Multicast Channel: MCH).

In FIG. 1, the following downlink physical signals are used in downlink radio communication. The downlink physical signals are not used to transmit information output from higher layers, but are used in the physical layer.

Synchronization Signal (SS)
Downlink Reference Signal (DL RS)

The synchronization signal is used for the terminal apparatus 1 to synchronize a frequency domain and a time domain of a downlink. In the TDD scheme, synchronization signals are arranged in subframes 0, 1, 5, and 6 of a radio frame. In the FDD scheme, synchronization signals are arranged in subframes 0 and 5 of a radio frame.

The downlink reference signal is used for the terminal apparatus 1 to correct a channel of a downlink physical channel. The downlink reference signal is used for the terminal apparatus 1 to calculate downlink channel state information. The downlink reference signal is used for the terminal apparatus 1 to measure a geographic location of the terminal apparatus 1.

In the embodiment, the following five types of downlink reference signals are used.

Cell-specific Reference Signal (CRS)
URS (UE-specific Reference Signal) associated with PDSCH
Demodulation Reference Signal (DMRS) associated with EPDCCH
Non-Zero Power Channel State Information-Reference Signal (NZP CSI-RS)
Zero Power Channel State Information-Reference Signal (ZP CSI-RS)
Multimedia Broadcast and Multicast Service over Signal Frequency Network Reference signal (MBSFN RS)
Positioning Reference Signal (PRS)

The CRS is transmitted with the entire band of a subframe. The CRS is used to demodulate the PBCH/PDCCH/PHICH/PCFICH/PDSCH. The CRS may be used for the terminal apparatus 1 to calculate the downlink channel state information. The PBCH/PDCCH/PHICH/PCFICH is transmitted with an antenna port used for transmission of the CRS.

The URS associated with the PDSCH is transmitted with a subframe and a band used for transmission of the PDSCH with which the URS is associated. The URS is used to demodulate the PDSCH with which the URS is associated.

The PDSCH is transmitted with an antenna port used for transmission of the CRS the URS. A DCI format 1A is used for scheduling of the PDSCH transmitted with the antenna port used for transmission of the CRS. A DCI format 2D is used for scheduling of the PDSCH transmitted with the antenna port used for transmission of the URS.

The DMRS associated with the EPDCCH is transmitted in a subframe and a bandwidth used for transmission of the EPDCCH with which the DMRS is associated. The DMRS is used to demodulate the EPDCCH with which the DMRS is associated. The EPDCCH is transmitted with an antenna port used for transmission of the DMRS.

The NZP CSI-RS is transmitted with a configured subframe. A resource transmitted by the NZP CSI-RS is configured by the base station apparatus. The NZP CSI-RS is used for the terminal apparatus 1 to calculate the downlink channel state information. The terminal apparatus 1 performs signal measurement (channel measurement) using the NZP CSI-RS.

The resource of the ZP CSI-RS is configured by the base station apparatus 3. The base station apparatus 3 transmits the ZP CSI-RS with a zero output power. That is, the base station apparatus 3 does not transmit the ZP CSI-RS. The base station apparatus 3 does not transmit the PDSCH and the EPDCCH in the configured resource of the ZP CSI-RS. For example, in a resource to which the NZP CSI-RS corresponds in a certain cell, the terminal apparatus 1 can measure interference.

The MBSFN RS is transmitted in the entire bandwidth of a subframe used for transmission of the PMCH. The MBSFN RS is used to demodulate the PMCH. The PMCH is transmitted on an antenna port used for transmission of the MBSFN RS.

The PRS is used for the terminal apparatus to measure a geographic location of the terminal apparatus.

The downlink physical channels and the downlink physical signals are collectively referred to as downlink signals. The uplink physical channels and the uplink physical signals are collectively referred to as uplink signals. The downlink physical channels and the uplink physical channels are collectively referred to as physical channels. The downlink physical signals and the uplink physical signals are collectively referred to as physical signals.

The BCH, MCH, UL-SCH, and DL-SCH are transport channels. A channel used in the Medium Access Control (MAC) layer is referred to as a transport channel. Units of transport channels used in the MAC layer are referred to as a transport block (TB) or an MAC protocol data unit (PDU). In the MAC layer, control of Hybrid Automatic Repeat reQuest (HARQ) is performed for each transport block. The transport block is units of data delivered from the MAC layer to the physical layer. In the physical layer, the transport block is mapped to a code word and a coding process is performed for each code word.

Hereinafter, the structure of a radio frame according to the embodiment will be described.

Figure 2:
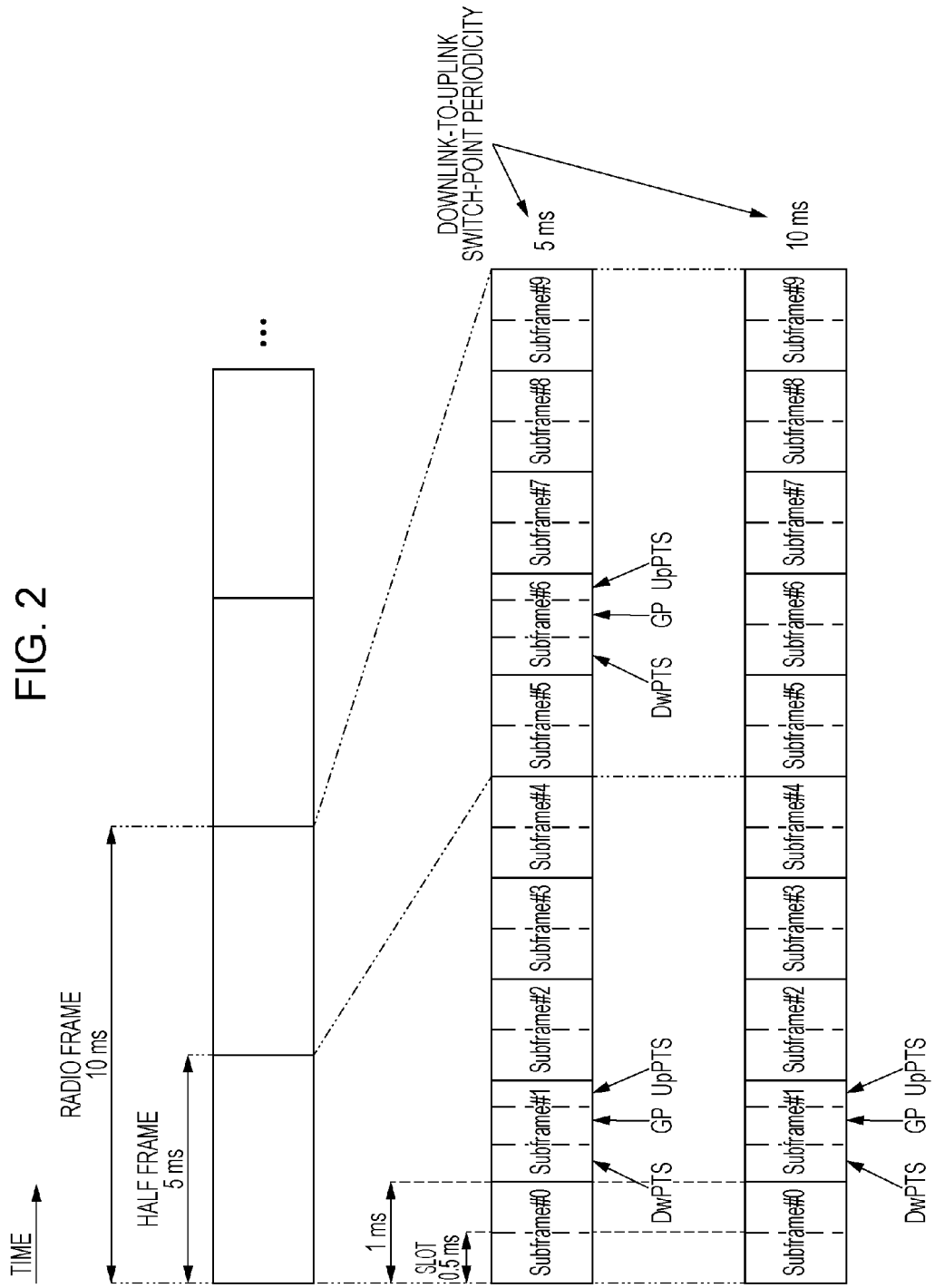
FIG. 2 is a diagram illustrating an overall structure of a radio frame according to the embodiment.

FIG. 2 is a diagram illustrating an overall structure of a radio frame according to the embodiment. Each of the radio frames has a length of 10 ms. In FIG. 2, the horizontal axis is a time axis. Each of the radio frames comprises two half frames. Each of the half frames has a length of 5 ms. Each of the half frames comprises five subframes. Each of the subframes comprises a length of 1 ms and is defined by two contiguous slots. Each of the slots comprises a length of 0.5 ms. An i-th subframe in the radio frame comprises a (2×i)-th slot and a (2×i+1)-th slot. That is, ten subframes can be used at intervals of 10 ms.

In the embodiment, the following three types of subframes are defined.

Downlink Subframe (first subframe)
Uplink Subframe (second subframe)
Special Subframe (third subframe)

The downlink subframe is a subframe reserved for downlink transmission. The uplink subframe is a subframe reserved for uplink transmission. The special subframe comprises three fields. The three fields are a Downlink Pilot Time Slot (DwPTS), a Guard Period (GP), an Uplink Pilot Time Slot (UpPTS). A total length of the DwPTS, the GP, and the UpPTS is 1 ms. The DwPTS is a field reserved for downlink transmission. The UpPTS is a field reserved for uplink transmission. The GP is a field for which the downlink transmission and the uplink transmission are not performed. The special subframe may comprise only the DwPTS and the GP or may comprise only the GP and the UpPTS.

A single radio frame includes at least a downlink subframe, an uplink subframe, and a special subframe.

The radio communication system according to the embodiment supports downlink-to-uplink switch-point periodicity of 5 ms and 10 ms. When the downlink-to-uplink switch-point periodicity is 5 ms, both of the half frames of the radio frame include the special subframe. When the downlink-to-uplink switch-point periodicity is 10 ms, only the first half frame in the radio frame includes the special subframe.

Hereinafter, the structure of a slot according to the embodiment will be described.

Figure 3:
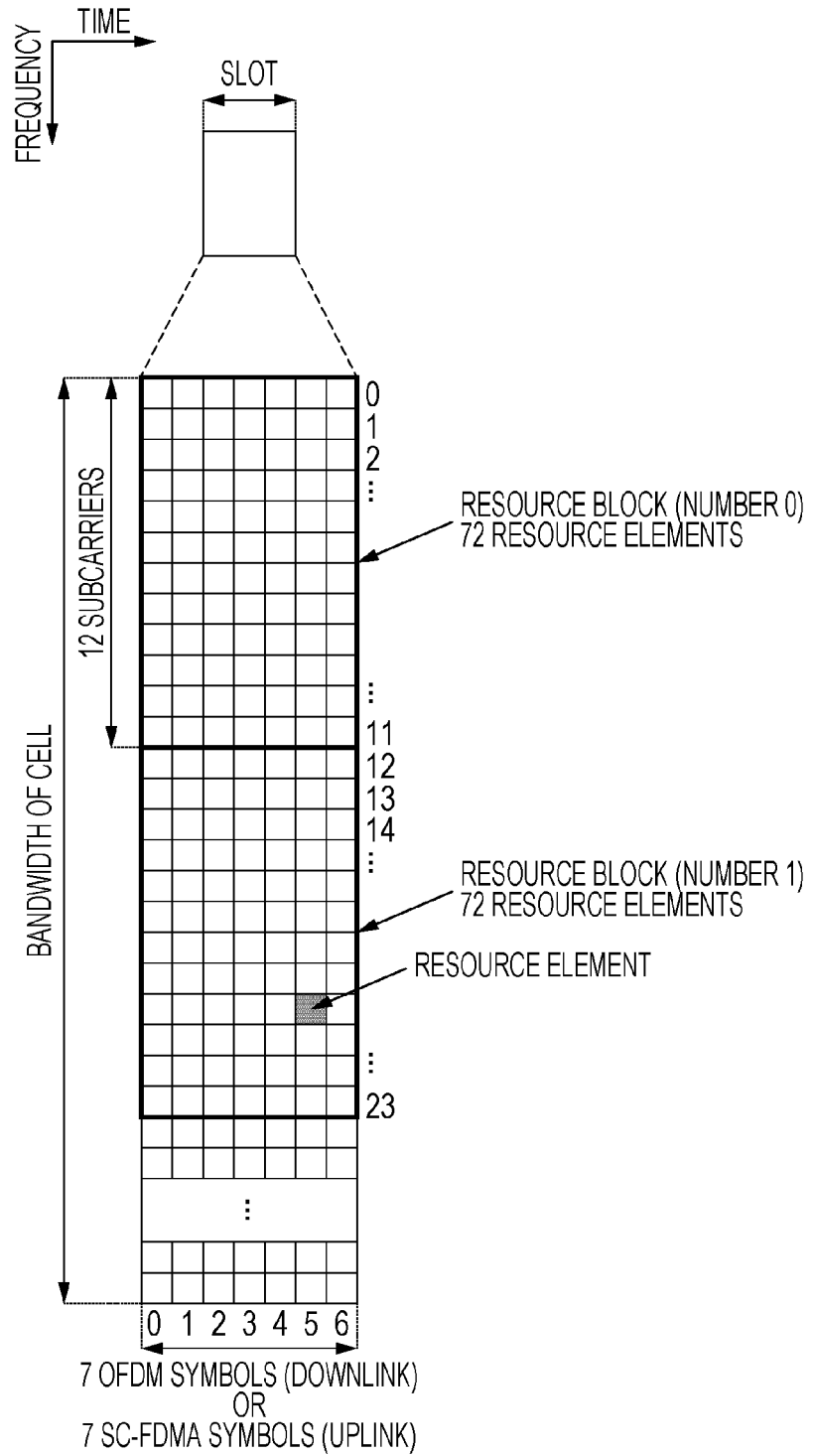
FIG. 3 is a diagram illustrating the structure of a slot according to the embodiment.

FIG. 3 is a diagram illustrating the structure of the slot according to the embodiment. In the embodiment, a normal cyclic prefix (CP) is applied to an OFDM symbol. An extended CP may also be applied to the OFDM symbol. A physical signal or a physical channel transmitted in each slot is expressed by a resource grid. In FIG. 3, the horizontal axis is a time axis and the vertical axis is a frequency axis. In a downlink, the resource grid is defined by a plurality of subcarriers and a plurality of OFDM symbols. In an uplink, the resource grid is defined by a plurality of subcarriers and a plurality of SC-FDMA symbols. The number of subcarriers included in one slot depends on the bandwidth of a cell. The number of OFDM symbols or SC-FDMA symbols included in one slot is 7. Each of elements in the resource grid is referred to as a resource element. The resource element is identified using a subcarrier number and an OFDM symbol or SC-FDMA symbol number.

The resource block is used to express mapping to a resource element of a certain physical channel (PDSCH, PUSCH, or the like). In the resource block, a virtual resource block and a physical resource block are defined. A certain physical channel is first mapped to a virtual resource block. Thereafter, the virtual resource block is mapped to a physical resource block. One physical resource block is defined by 7 contiguous OFDM symbols or SC-FDMA symbols in a time domain and 12 contiguous subcarriers in a frequency domain. Therefore, one physical resource block includes (7×12) resource elements. One physical resource block corresponds to one slot in the time domain and corresponds to 180 kHz in the frequency domain. The physical resource block is numbered from 0 in the frequency domain.

Hereinafter, the physical channels and the physical signals transmitted in the subframes will be described.

Figure 4:
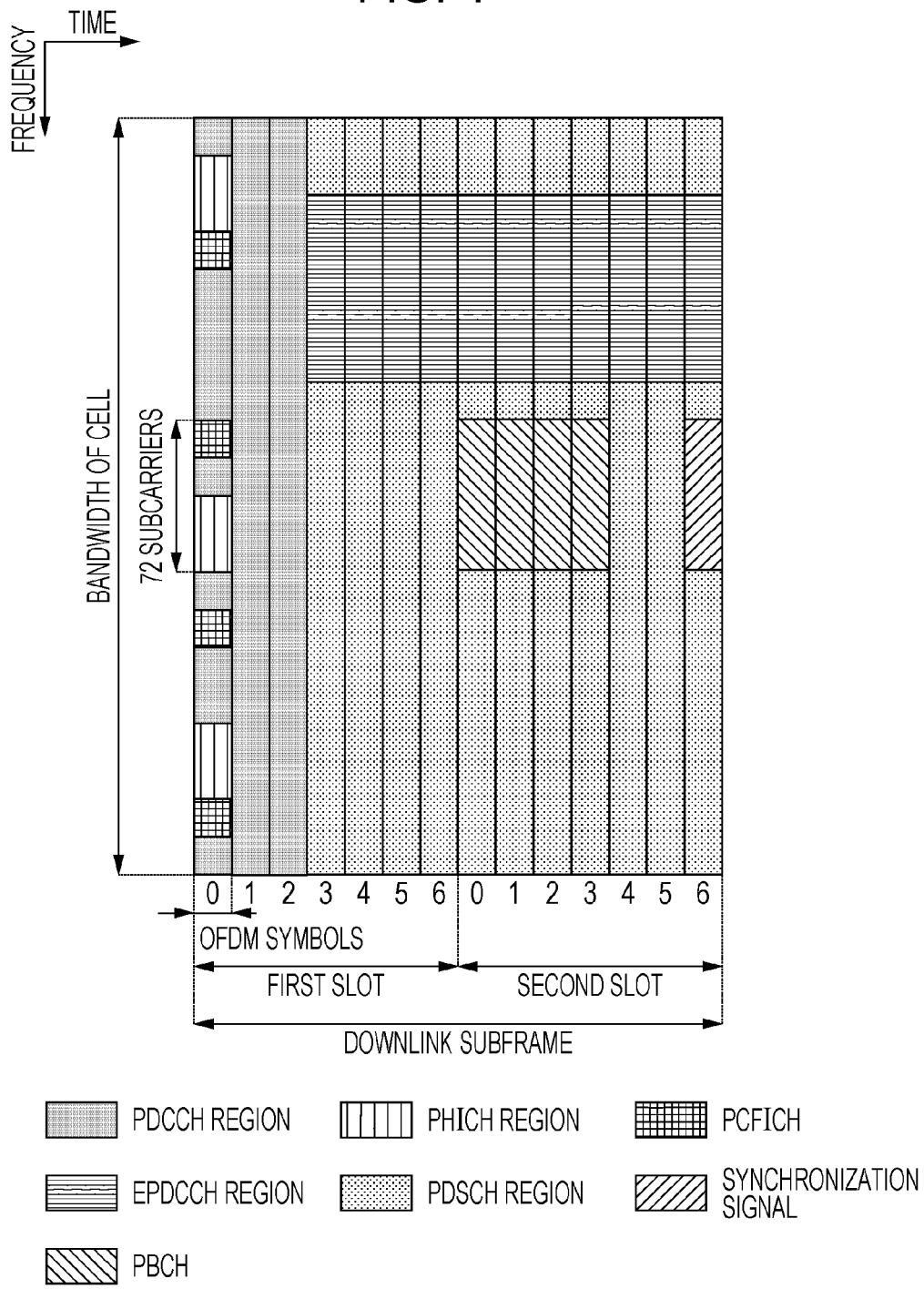
FIG. 4 is a diagram illustrating an example of arrangement of physical channels and physical signals in a downlink subframe according to the embodiment.

FIG. 4 is a diagram illustrating an example of arrangement of the physical channels and the physical signals in the downlink subframe according to the embodiment. In FIG. 4, the horizontal axis is a time axis and the vertical axis is a frequency axis. The base station apparatus 3 may transmit the downlink physical channels (the PBCH, the PCFICH, the PHICH, the PDCCH, the EPDCCH, and the PDSCH) and the downlink physical signals (the synchronization signal and the downlink reference signal) in the downlink subframe. The PBCH is transmitted only in subframe 0 in the radio frame. The downlink reference signal is arranged in the resource elements dispersed in the frequency domain and the time domain. To facilitate the description, the downlink reference signal is not illustrated in FIG. 4.

In a PDCCH region, the plurality of PDCCHs may be subjected to frequency and time multiplexing. In an EPDCCH region, the plurality of EPDCCHs may be subjected to frequency, time, and space multiplexing. In a PDSCH region, the plurality of PDSCHs may be subjected to frequency and space multiplexing. The PDCCH and the PDSCH or EPDCCH may be subjected to time multiplexing. The PDSCH and the EPDCCH may be subjected to frequency multiplexing.

Figure 5:
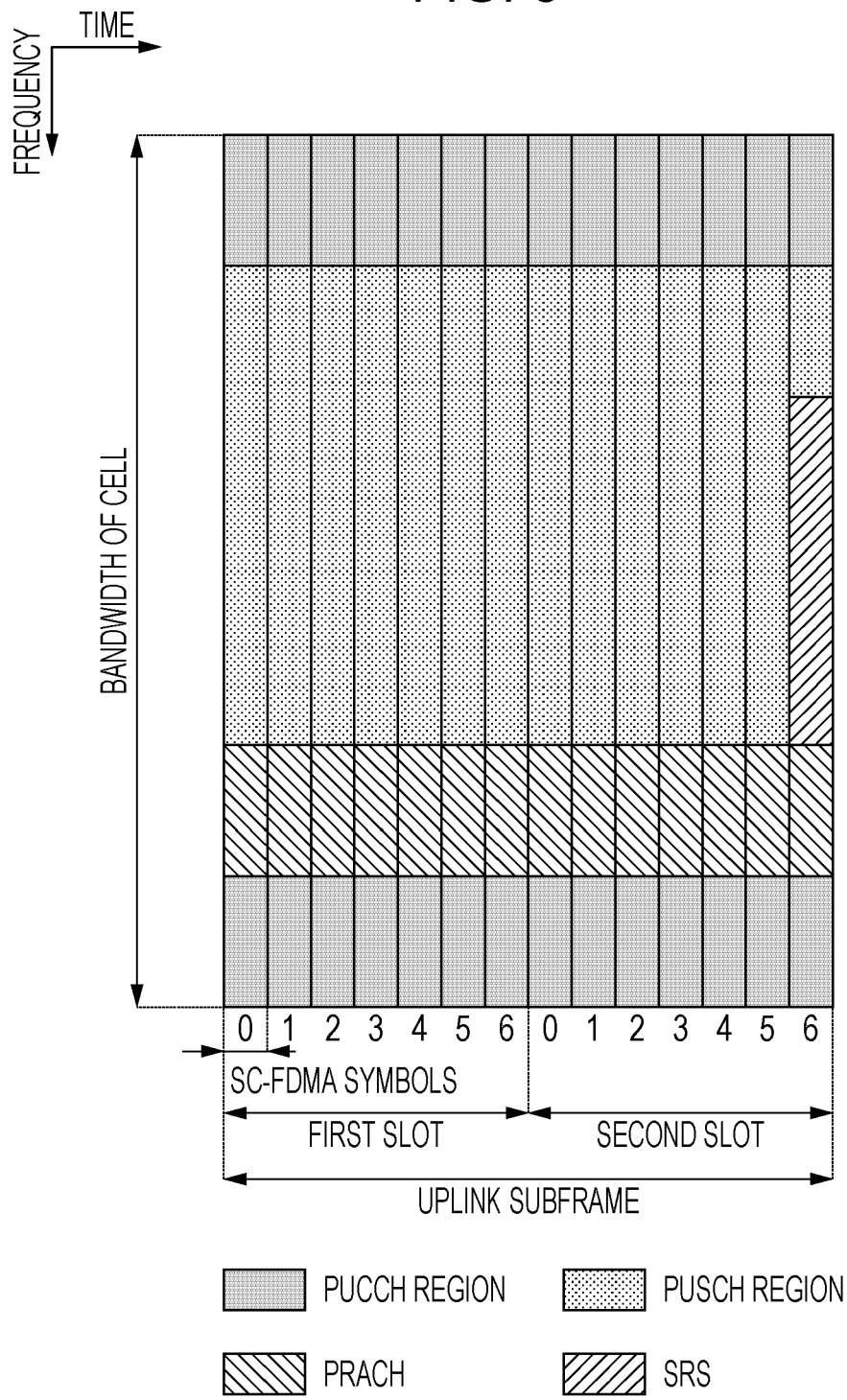
FIG. 5 is a diagram illustrating an example of arrangement of the physical channels and the physical signals in an uplink subframe according to the embodiment.

FIG. 5 is a diagram illustrating an example of arrangement of the physical channels and the physical signals in the uplink subframe according to the embodiment. In FIG. 5, the horizontal axis is a time axis and the vertical axis is a frequency axis. The terminal apparatus 1 may transmit the uplink physical channels (the PUCCH, the PUSCH, and the PRACH) and the uplink physical signals (the DMRS and the SRS) in the uplink subframe. In a PUCCH region, the plurality of PUCCHs are subjected to frequency, time, and code multiplexing. In a PUSCH region, the plurality of PUSCHs are subjected to frequency and space multiplexing. The PUCCH and the PUSCH may be subjected to frequency multiplexing. The PRACHs may be arranged in a single subframe or two subframes. The plurality of PRACHs may be subjected to code multiplexing.

The SRS is transmitted using the last SC-FDMA symbol in the uplink subframe. That is, the SRS is arranged in the last SC-FDMA symbol in the uplink subframe. The terminal apparatus 1 may not simultaneously transmit the SRS and the PUCCH/PUSCH/PRACH in the single SC-FDMA symbol of the single cell. In the single uplink subframe of the single cell, the terminal apparatus 1 can transmit the PUSCH and/or the PUCCH using the SC-FDMA symbols excluding the last SC-FDMA symbol in this uplink subframe and can transmit the SRS using the last SC-FDMA symbol in this uplink subframe. That is, the terminal apparatus 1 can transmit both of the SRS and the PUSCH/PUCCH in the single uplink subframe of the single cell. The DMRS is subjected to time multiplexing along with the PUCCH or the PUSCH. To simplify the description, the DMRS in FIG. 5 is not illustrated.

Figure 6:
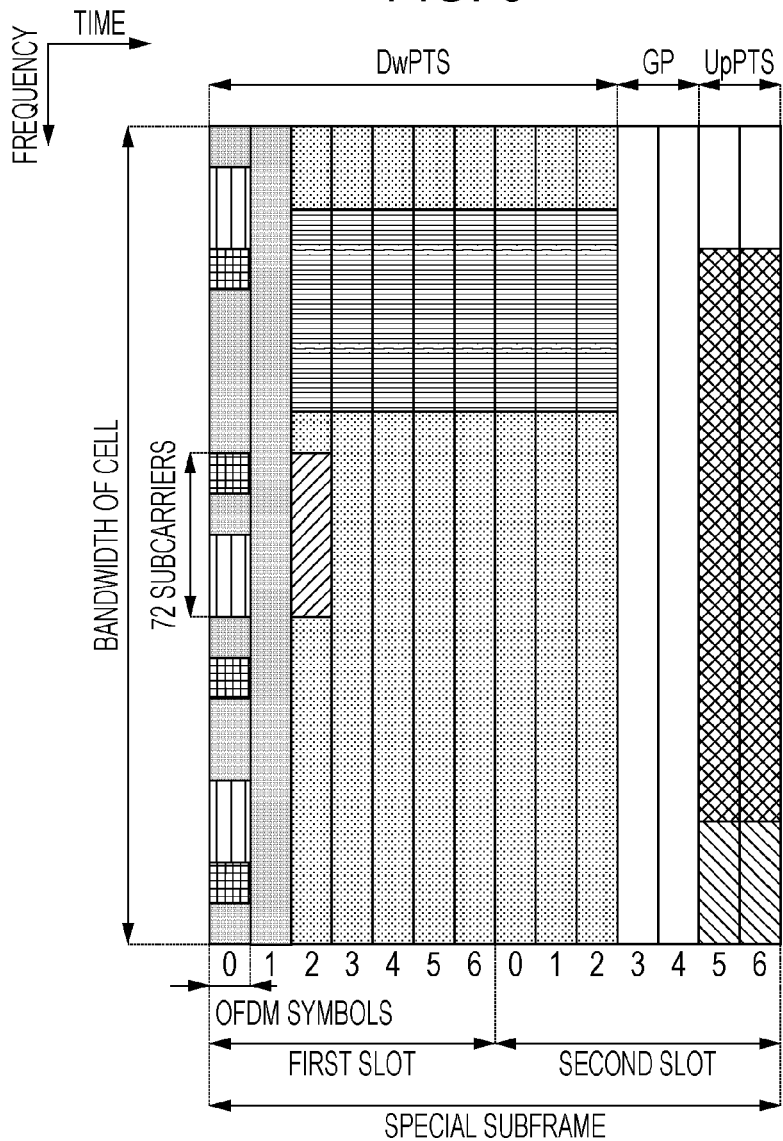
FIG. 6 is a diagram illustrating an example of arrangement of the physical channels and the physical signals in a special subframe according to the embodiment.

FIG. 6 is a diagram illustrating an example of arrangement of the physical channels and the physical signals in a special subframe according to the embodiment. In FIG. 6, the horizontal axis is a time axis and the vertical axis is a frequency axis. In FIG. 6, the DwPTS includes first to tenth SC-FDMA symbols in the special subframe, the GP includes eleventh and twelfth SC-FDMA symbols in the special subframe, and the UpPTS includes thirteen and fourteen SC-FDMA symbols in the special subframe.

The base station apparatus 3 may transmit the PCFICH, the PHICH, the PDCCH, the EPDCCH, the PDSCH, the synchronization signal, and the downlink reference signal in the DwPTS of the special subframe. The base station apparatus 3 does not transmit the PBCH in the DwPTS of the special subframe. The terminal apparatus 1 may transmit the PRACH and the SRS in the UpPTS of the special subframe. That is, the terminal apparatus 1 does not transmit the PUCCH, the PUSCH, and the DMRS in the UpPTS of the special subframe.

Hereinafter, uplink reference uplink-downlink (UL-DL) configuration, downlink reference uplink-downlink (UL-DL) configuration, and transmission direction uplink-downlink (UL-DL) configuration will be described.

The uplink reference UL-DL configuration, the downlink reference UL-DL configuration, and the transmission direction UL-DL configuration are defined by uplink-downlink (UL-DL) configuration.

The uplink-downlink configuration is configuration related to a pattern of the subframes in the radio frame. The uplink-downlink configuration indicates which subframe each of the subframes in the radio frame is among the downlink subframe, the uplink subframe, and the special subframe.

That is, the uplink reference UL-DL configuration, the downlink reference UL-DL configuration, and the transmission direction UL-DL configuration are defined by a pattern of the downlink subframe, the uplink subframe, and the special subframe in the radio frame.

The pattern of the downlink subframe, the uplink subframe, and the special subframe indicates that each of subframes #0 to #9 is one of the downlink subframe, the uplink subframe, and the special subframe and is preferably expressed by any combination with a length 10 of D, U, and S (respectively representing the downlink subframe, the uplink subframe, and the special subframe). More preferably, the head (that is, subframe #0) is D and the second subframe (that is, subframe #1) is S.

FIG. 7 is a table illustrating an example of uplink-downlink configuration according to the embodiment. In FIG. 7, D represents the downlink subframe, U represents the uplink subframe, and S represents the special subframe.

In FIG. 7, subframe 1 in the radio frame is usually the special subframe. In FIG. 7, subframes 0 and 5 are usually reserved for downlink transmission and subframe 2 is usually reserved for uplink transmission.

In FIG. 7, when the downlink-uplink switch-point periodicity is 5 ms, subframe 6 in the radio frame is the special subframe. When the downlink-uplink switch-point periodicity is 10 ms, subframe 6 in the radio frame is the downlink subframe.

The uplink reference UL-DL configuration is also referred to as a first parameter, first configuration, or serving cell uplink-downlink configuration. The downlink reference UL-DL configuration is also referred to as a second parameter or second configuration. The transmission direction UL-DL configuration is also referred to as a third parameter or third configuration.

Setting uplink-downlink configuration i as the uplink reference UL-DL configuration is referred to as setting uplink reference UL-DL configuration i. Setting uplink-downlink configuration i as the downlink reference UL-DL configuration is referred to as setting downlink reference UL-DL configuration i. Setting uplink-downlink configuration i as the transmission direction UL-DL configuration is referred to as setting transmission direction UL-DL configuration i.

Hereinafter, methods of setting the uplink reference UL-DL configuration, the downlink reference UL-DL configuration, and the transmission direction UL-DL configuration will be described.

The base station apparatus 3 sets the uplink reference UL-DL configuration, the downlink reference UL-DL configuration, and the transmission direction UL-DL configuration. The base station apparatus 3 may transmit first information (TDD-Config) indicating the uplink reference UL-DL configuration, second information indicating the downlink reference UL-DL configuration, and third information indicating the transmission direction UL-DL configuration, by including the first information, the second information, and the third information in at least one of the MIB, a system information block type 1 message, a system information message, an RRC message, an MAC control element (CE), and control information (for example, the DCI format) of the physical layer. According to a circumstance, the base station apparatus 3 may include the first information, the second information, and the third information in one of the MIB, the system information block type 1 message, the system information message, the RRC message, the MAC control element (CE), and the control information (for example, the DCI format) of the physical layer.

For each of the plurality of serving cells, the uplink reference UL-DL configuration, the downlink reference UL-DL configuration, and the transmission direction UL-DL configuration may be defined.

The base station apparatus 3 transmits the first information, the second information, and the third information regarding each serving cell to the terminal apparatus 1 in which the plurality of serving cells are configured. For each serving cell, the first information, the second information, and the third information may be defined.

The base station apparatus 3 may transmit the first information for a primary cell, the second information for the primary cell, the third information for the primary cell, the first information for a secondary cell, the second information for the secondary cell, and the third information for the secondary cell to the terminal apparatus 1 in which the two serving cells including one primary cell and one secondary cell are configured.

The terminal apparatus 1 in which the plurality of serving cells are configured may set the uplink reference UL-DL configuration, the downlink reference UL-DL configuration, and the transmission direction UL-DL configuration for each serving cell on the basis of the first information, the second information, and the third information.

The terminal apparatus 1 in which two serving cells including one primary cell and one secondary cell are configured may set the uplink reference UL-DL configuration regarding the primary cell, the downlink reference UL-DL configuration regarding the primary cell, the transmission direction UL-DL configuration regarding the primary cell, the uplink reference UL-DL configuration regarding the secondary cell, the downlink reference UL-DL configuration regarding the secondary cell, and the transmission direction UL-DL configuration regarding the secondary cell.

The first information regarding the primary cell is preferably included in the system information block type 1 message or the RRC message. The first information regarding the secondary cell is preferably included in the RRC message. The second information regarding the primary cell is preferably included in the system information block type 1 message, the system information message, or the RRC message. The second information regarding the secondary cell is preferably included in the RRC message. The third information is preferably included in the control information (for example, the DCI format) of the physical layer.

The first information is preferably common to the plurality of terminal apparatuses 1 in the cell. The second information may be common to the plurality of terminal apparatuses 1 in the cell or may be dedicated for the terminal apparatus 1. The third information may be common to the plurality of terminal apparatuses 1 in the cell or may be dedicated for the terminal apparatus 1.

The system information block type 1 message is initially transmitted in subframe 5 of the radio frame satisfying SFN mod 8=0 via the PDSCH and is retransmitted (repeated) in subframe 5 of another radio frame satisfying SFN mod 2=0. The system information block type 1 message includes information indicating the configuration (the length of the DwPTS, the GP, and the UpPTS) of the special subframe. The system information block type 1 message is cell-specific information.

The system information message is transmitted via the PDSCH. The system information message is cell-specific information. The system information message includes system information block X other than system information block type 1.

The RRC message is transmitted via the PDSCH. The RRC message is information/signal processed in an RRC layer. The RRC message may be common to the plurality of terminal apparatuses 1 in the cell or may be dedicated for the specific terminal apparatus 1.

The MAC CE is transmitted via the PDSCH. The MAC CE is information/signal processed in the MAC layer.

Figure 8:
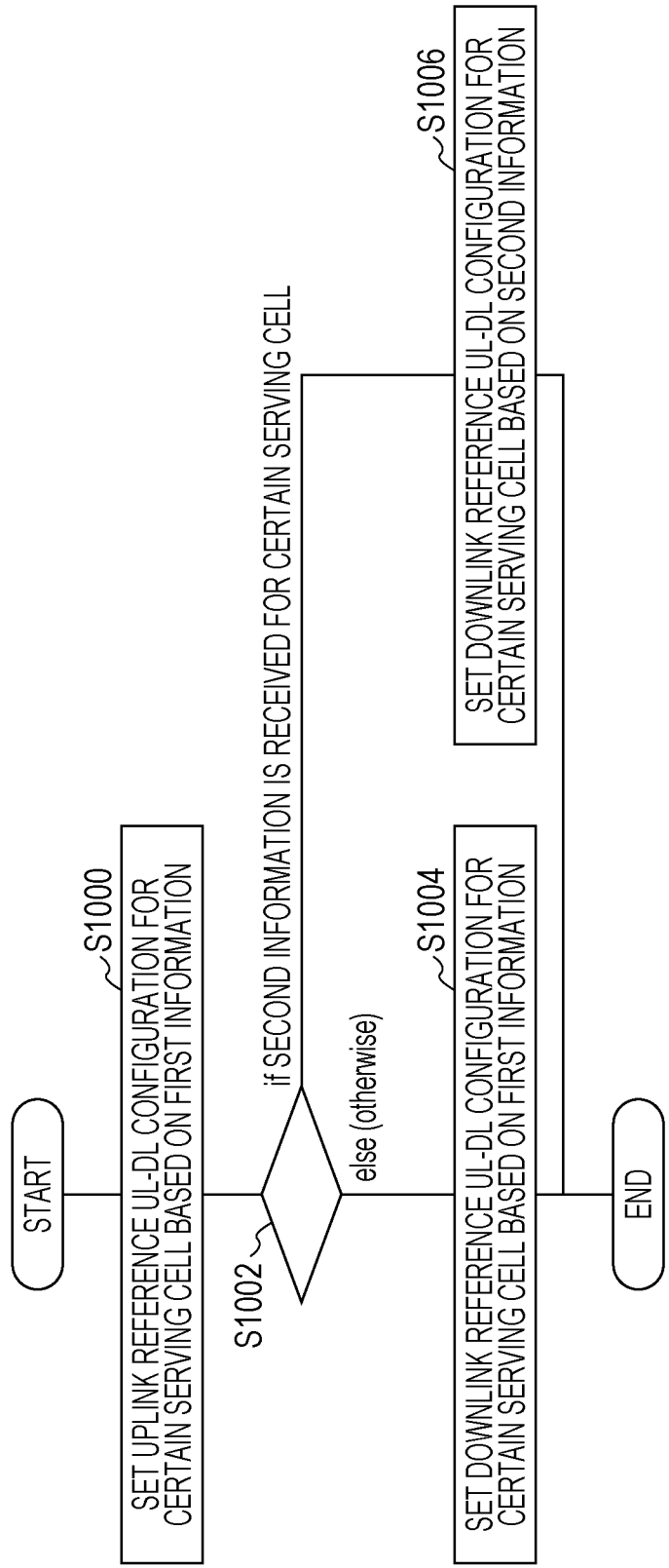
FIG. 8 is a flowchart illustrating a method of setting uplink reference UL-DL configuration and downlink reference UL-DL configuration according to the embodiment.

FIG. 8 is a flowchart illustrating a method of setting the uplink reference UL-DL configuration and the downlink reference UL-DL configuration according to the embodiment. The terminal apparatus 1 performs the setting method in FIG. 8 on each of the plurality of serving cells.

The terminal apparatus 1 sets the uplink reference UL-DL configuration on the basis of the first information for a certain serving cell (S1000). The terminal apparatus 1 determines whether the second information for the certain serving cell is received (S1002). If the terminal apparatus 1 receives the second information for the certain serving cell, the terminal apparatus 1 sets downlink reference UL-DL configuration for the certain serving cell on the basis of the second information for the certain serving cell (S1006). If the terminal apparatus 1 does not receive the second information for the certain serving cell (else/otherwise), the terminal apparatus 1 sets the downlink reference UL-DL configuration for the certain serving cell on the basis of the first information for the certain serving cell (S1004).

The serving cell in which the uplink reference UL-DL configuration and the downlink reference UL-DL configuration are set on the basis of the first information is also referred to as a serving cell in which no dynamic TDD is configured. The serving cell in which the downlink reference UL-DL configuration is set on the basis of the second information is also referred to as a serving cell in which the dynamic TDD is configured.

The terminal apparatus 1 receives the second information and determines the subframe in which the uplink signal can be transmitted based on the second information. Next, the terminal apparatus 1 monitors the third information. When the terminal apparatus 1 receives the third information, the terminal apparatus 1 determines the subframe in which the uplink signal can be transmitted on the basis of the third information.

Hereinafter, the uplink reference UL-DL configuration will be described.

The uplink reference UL-DL configuration is used in the serving cell at least to specify the subframe for which the uplink transmission is possible or not possible.

The terminal apparatus 1 does not perform the uplink transmission in the subframe indicated as the downlink subframe by the uplink reference UL-DL configuration. The terminal apparatus 1 does not perform the uplink transmission in the DwPTS and the GP of the subframe indicated as the special subframe by the uplink reference UL-DL configuration.

Hereinafter, the downlink reference UL-DL configuration will be described.

The downlink reference UL-DL configuration is used in the serving cell at least to specify the subframe for which the downlink transmission is possible or not possible.

The terminal apparatus 1 does not perform the downlink transmission in the subframe indicated as the uplink subframe by the downlink reference UL-DL configuration. The terminal apparatus 1 does not perform the downlink transmission in the UpPTS and the GP of the subframe indicated as the special subframe by the downlink reference UL-DL configuration.

The terminal apparatus 1 setting the downlink reference UL-DL configuration on the basis of the first information may perform measurement (for example, measurement related to the channel state information) using the downlink signal in the DwPTS of the special subframe or the downlink subframe indicated by the uplink reference UL-DL configuration or the downlink reference UL-DL configuration.

The base station apparatus 3 determines the downlink reference UL-DL configuration in a set (configuration of a set) of the configurations restricted based on the uplink reference UL-DL configuration. That is, the downlink reference UL-DL configuration is an element of the configuration set restricted on the basis of the uplink reference UL-DL configuration. The configuration set restricted based on the uplink reference UL-DL configuration includes uplink-downlink configuration satisfying conditions (a) to (c) of FIG. 9. FIG. 9 is a diagram illustrating a relation between the subframe indicated by the uplink reference UL-DL configuration and the subframe indicated by the downlink reference UL-DL configuration according to the embodiment. In FIG. 9, D indicates a downlink subframe, U indicates an uplink subframe, and S indicates a special subframe.

Thus, since the DwPTS of the special subframe and the subframe indicated as the downlink subframe by the uplink reference UL-DL configuration is not used for the uplink transmission in the dynamic TDD, the terminal apparatus 1 setting the downlink reference UL-DL configuration on the basis of the first information can appropriately perform measurement using the downlink signal.

The terminal apparatus 1 setting the downlink reference UL-DL configuration on the basis of the second information may also perform measurement (for example, measurement related to the channel state information) using the downlink signal in the DwPTS of the special subframe or the downlink subframe indicated by the uplink reference UL-DL configuration.

The subframe indicated as the uplink subframe by the uplink reference UL-DL configuration and indicated as the downlink subframe by the downlink reference UL-DL configuration is also referred to as a first flexible subframe. The first flexible subframe is a subframe that is reserved for uplink and downlink transmission.

The subframe indicated as the special subframe by the uplink reference UL-DL configuration and indicated as the downlink subframe by the downlink reference UL-DL configuration is also referred to as a second flexible subframe. The second flexible subframe is a subframe that is reserved for downlink transmission. The second flexible subframe is a subframe that is reserved for downlink transmission in the DwPTS and uplink transmission in the UpPTS.

Hereinafter, the transmission direction UL-DL configuration will be described in detail.

The terminal apparatus 1 and the base station apparatus 3 set the transmission direction UL-DL configuration related to transmission directions (uplink/downlink) in the subframe. The transmission direction UL-DL configuration is used to determine the transmission direction in the subframe.

The terminal apparatus 1 controls the transmission in the first flexible subframe and the second flexible subframe on the basis of scheduling information (the DCI format and/or the HARQ-ACK) and the transmission direction UL-DL configuration.

The base station apparatus 3 transmits the third information indicating the transmission direction UL-DL configuration to the terminal apparatus 1. The third information is information that indicates the subframe for which the uplink transmission is possible. The third information is information that indicates the subframe for which the downlink transmission is possible. The third information is information that indicates the subframe for which the uplink transmission in the UpPTS and the downlink transmission in the DwPTS are possible.

For example, the transmission direction UL-DL configuration is used to specify a transmission direction of the subframe which is indicated as the uplink subframe by the uplink reference UL-DL configuration and is indicated as the downlink subframe by the downlink reference UL-DL configuration and/or the subframe which is indicated as the special subframe by the uplink reference UL-DL configuration and is indicated as the downlink subframe by the downlink reference UL-DL configuration. That is, the transmission direction UL-DL configuration is used to specify the transmission direction of the subframe indicated as the subframe different in the uplink reference UL-DL configuration and the downlink reference UL-DL configuration.

FIG. 10 is a diagram illustrating a relation between the subframe indicated by the uplink reference UL-DL configuration, the subframe indicated by the downlink reference UL-DL configuration, and the subframe indicated by the transmission direction UL-DL configuration according to the embodiment. In FIG. 10, D indicates the downlink subframe, U indicates the uplink subframe, and S indicates the special subframe.

The base station apparatus 3 determines the transmission direction UL-DL configuration in a configuration set (configuration of a set) restricted on the basis of the uplink reference UL-DL configuration and the downlink reference UL-DL configuration. That is, the transmission direction UL-DL configuration is an element in the configuration set restricted on the basis of the uplink reference UL-DL configuration and the downlink reference UL-DL configuration. The configuration set restricted based on the uplink reference UL-DL configuration and the downlink reference UL-DL configuration includes uplink-downlink configuration that satisfies conditions (d) to (h) of FIG. 10.

The base station apparatus 3 may perform scheduling of the downlink transmission in the subframe indicated as the downlink subframe by the transmission direction UL-DL configuration.

The terminal apparatus 1 may perform a process of receiving the downlink signal in the subframe indicated as the downlink subframe by the transmission direction UL-DL configuration. The terminal apparatus 1 may monitor the PDCCH/EPDCCH in the subframe indicated as the downlink subframe by the transmission direction UL-DL configuration. The terminal apparatus 1 may perform a process of receiving the PDSCH in the subframe indicated as the downlink subframe by the transmission direction UL-DL configuration based on the detection of the downlink grant via the PDCCH/EPDCCH.

When transmission of the uplink signal (PUSCH/SRS) in the subframe indicated as the downlink subframe by the transmission direction UL-DL configuration is scheduled or configured, the terminal apparatus 1 does not perform a process of transmitting the uplink signal (PUSCH/SRS) in the subframe.

The base station apparatus 3 may schedule the uplink transmission in the subframe indicated as the uplink subframe by the transmission direction UL-DL configuration.

The base station apparatus 3 may schedule the downlink transmission in the subframe indicated as the uplink subframe by the transmission direction UL-DL configuration. The scheduling of the downlink transmission by the base station apparatus 3 may be prohibited in the subframe indicated as the uplink subframe by the transmission direction UL-DL configuration.

The terminal apparatus 1 may perform a process of transmitting the uplink signal in the subframe indicated as the uplink subframe by the transmission direction UL-DL configuration. When transmission of the uplink signal (PUSCH/DMRS/SRS) in the subframe indicated as the uplink subframe by the transmission direction UL-DL configuration is scheduled or configured, the terminal apparatus 1 may perform a process of transmitting the uplink signal (PUSCH/DMRS/SRS) in the subframe.

The terminal apparatus 1 may perform a process of receiving the downlink signal in the subframe which is indicated as the uplink subframe by the transmission direction UL-DL configuration and for which the uplink transmission is not scheduled. The process of receiving the downlink signal by the terminal apparatus 1 may be prohibited in the subframe indicated as the uplink subframe by the transmission direction UL-DL configuration.

The base station apparatus 3 may schedule the downlink transmission in the DwPTS of the subframe indicated as the special subframe by the transmission direction UL-DL configuration.

The terminal apparatus 1 may perform a process of receiving the downlink signal in the DwPTS of the subframe indicated as the special subframe by the transmission direction UL-DL configuration. The terminal apparatus 1 may monitor the PDCCH/EPDCCH in the DwPTS of the subframe indicated as the special subframe by the transmission direction UL-DL configuration. The terminal apparatus 1 may perform a process of receiving the PDSCH in the DwPTS of the subframe indicated as the special subframe by the transmission direction UL-DL configuration based on the detection of the downlink grant via the PDCCH/EPDCCH.

When the transmission of the PUSCH in the subframe indicated as the special subframe by the transmission direction UL-DL configuration is scheduled or configured, the terminal apparatus 1 does not perform the process of transmitting the PUSCH in the subframe.

When the transmission of the SRS in the UpPTS of the subframe indicated as the special subframe by the transmission direction UL-DL configuration is scheduled or configured, the terminal apparatus 1 may perform a process of transmitting the SRS in the UpPTS of the subframe.

FIG. 11 is a diagram illustrating a relation between the uplink reference UL-DL configuration, the downlink reference UL-DL configuration, and the transmission direction UL-DL configuration according to the embodiment.

For example, when the uplink reference UL-DL configuration is 0 in FIG. 11, the downlink reference UL-DL configuration is one of a set downlink reference UL-DL configuration {0, 1, 2, 3, 4, 5, 6}. For example, when the uplink reference UL-DL configuration is 1 in FIG. 11, the downlink reference UL-DL configuration is one of a set downlink reference UL-DL configuration {1, 2, 4, 5}.

For example, when the uplink reference UL-DL configuration is 0 and the downlink reference UL-DL configuration is 1 in FIG. 11, the transmission direction UL-DL configuration is one of a set {0, 1, 6}.

The value of the downlink reference UL-DL configuration may be the same as the value of the uplink reference UL-DL configuration. However, the value of the downlink reference UL-DL configuration indicated by the second information is preferably not the same as the value of the uplink reference UL-DL configuration indicated by the first information in order that the terminal apparatus 1 not receiving the second information sets the same value as the value of the uplink reference UL-DL configuration as the downlink reference UL-DL configuration.

When the value of the uplink reference UL-DL configuration is the same as the value of the downlink reference UL-DL configuration, the transmission direction UL-DL configuration may not be defined. When the value of the uplink reference UL-DL configuration is the same as the value of the downlink reference UL-DL configuration, the same value as the value of the uplink reference UL-DL configuration and the value of the downlink reference UL-DL configuration may be set in the transmission direction UL-DL configuration.

Hereinafter, the uplink HARQ timing will be described in detail.

The uplink reference UL-DL configuration is used to specify (select or determine) correspondence between subframe n in which the PDCCH/EPDCCH/PHICH are arranged and subframe n+k in which the PUSCHs corresponding to the PDCCH/EPDCCH/PHICH are arranged.

FIG. 12 is a diagram illustrating correspondence between subframe n in which PDCCH/EPDCCH/PHICH are arranged and subframe n+k in which the PUSCHs corresponding to the PDCCH/EPDCCH/PHICH are arranged according to the embodiment. The terminal apparatus 1 specifies (selects or determines) the value of k with reference to the table of FIG. 12. Hereinafter, in the description of FIG. 12, the uplink reference UL-DL configuration is simply referred to as the uplink-downlink configuration.

When the terminal apparatus 1 detects the PDCCH/EPDCCH with the uplink grant which targets the terminal apparatus 1 in subframe n for the serving cell in which uplink-downlink configurations 1 to 6 are set, the terminal apparatus 1 transmits the PUSCH according to the uplink grant in subframe n+k specified (selected or determined) based on the table of FIG. 12.

When the terminal apparatus 1 detects the PHICH with the NACK that targets the terminal apparatus 1 in subframe n for the serving cell in which uplink-downlink configurations 1 to 6 are set, the terminal apparatus 1 transmits the PUSCH in subframe n+k specified (selected or determined) on the basis of the table of FIG. 12.

The uplink grant that targets the terminal apparatus 1 includes a 2-bit uplink index (UL index) for the serving cell in which uplink-downlink configuration 0 is set. The uplink grant that targets the terminal apparatus 1 does not include the uplink index (UL index) for the serving cell in which uplink-downlink configurations 1 to 6 are set.

When 1 is set as the most significant bit (MSB) of the uplink index included in the uplink grant corresponding to the serving cell in which uplink-downlink configuration 0 is set in subframe n, the terminal apparatus 1 adjusts the transmission of the PUSCH according to the uplink grant in subframe n+k specified (selected or determined) on the basis of the table of FIG. 12.

When the PHICH accompanying the NACK corresponding to the serving cell in which uplink-downlink configuration 0 is set is received in a first resource set in subframe n=0 or 5, the terminal apparatus 1 adjusts the transmission of the PUSCH corresponding to the PHICH in subframe n+k specified (selected or determined) on the basis of the table of FIG. 12.

When 1 is set as the least significant bit (LSB) of the uplink index included in the uplink grant corresponding to the serving cell in which the uplink-downlink configuration 0 is set in subframe n, the terminal apparatus 1 adjusts the transmission of the PUSCH corresponding to the uplink grant in subframe n+7.

When the PHICH with the NACK corresponding to the serving cell in which uplink-downlink configuration 0 is set is received in a second resource set in subframe n=0 or 5, the terminal apparatus 1 adjusts the transmission of the PUSCH corresponding to the uplink grant in subframe n+7.

When the PHICH accompanying the NACK corresponding to the serving cell in which the uplink-downlink configuration 0 is set is received in subframe n=1 or 6, the terminal apparatus 1 adjusts the transmission of the PUSCH corresponding to the uplink grant in subframe n+7.

For example, when the terminal apparatus 1 detects the PDCCH/EPDCCH/PHICH corresponding to the serving cell in which the uplink-downlink configuration 0 is set in [SFN=m, subframe 1], the terminal apparatus 1 adjusts the transmission of the PUSCH in the subframe [SFN=m, subframe 7] located later by six subframes.

The uplink reference UL-DL configuration is used to specify (select or determine) correspondence between subframe n in which the PHICH is arranged and subframe n-k in which the PUSCH corresponding to the PHICH is arranged.

FIG. 13 is a diagram illustrating correspondence between subframe n in which the PHICH is arranged and subframe n-k in which the PUSCH corresponding to the PHICH is arranged according to the embodiment. The terminal apparatus 1 specifies (selects or determines) the value of k on the basis of the table of FIG. 13. Hereinafter, in the description of FIG. 13, the uplink reference UL-DL configuration is simply referred to as the uplink-downlink configuration.

For the serving cell in which uplink-downlink configurations 1 to 6 are set, the HARQ indicator (HARQ-ACK) received via the PHICH corresponding to this serving cell in subframe n is associated with the transmission of the PUSCH in subframe n-k specified based on the table of FIG. 13.

For the serving cell in which uplink-downlink configuration 0 is set, the first resource set in subframe n=0 or 5 or the HARQ indicator (HARQ-ACK) received via the PHICH corresponding to the serving cell in subframe n=1 or 6 is associated with the transmission of the PUSCH in subframe n-k specified based on the table of FIG. 13.

For the serving cell in which uplink-downlink configuration 0 is set, the HARQ indicator (HARQ-ACK) received via the PHICH corresponding to the serving cell in the second resource set in subframe n=0 or 5 is associated with the transmission of the PUSCH in subframe n-6.

For example, for the serving cell in which uplink-downlink configuration 1 is set, the HARQ indicator (HARQ-ACK) received via the PHICH in [SFN=m, subframe 1] is associated with the transmission of the PUSCH in the subframe [SFN=m−1, subframe 7] of 4 subframes before [SFN=m, subframe 1].

The uplink reference UL-DL configuration is used to specify (select or determine) correspondence between subframe n in which the PUSCH is arranged and subframe n+k in which the PHICH corresponding to the PUSCH is arranged.

FIG. 14 is a diagram illustrating correspondence between subframe n in which the PUSCH is arranged and subframe n+k in which the PHICH corresponding to the PUSCH is arranged according to the embodiment. The terminal apparatus 1 specifies (selects or determines) the value of k on the basis of the table of FIG. 14. Hereinafter, in the description of FIG. 14, the uplink reference UL-DL configuration is simply referred to as the uplink-downlink configuration.

When the transmission of the PUSCH in subframe n is scheduled, the terminal apparatus 1 determines a PHICH resource in subframe n+k specified from the table of FIG. 14.

For example, when the transmission of the PUSCH in [SFN=m, subframe n=2] is scheduled for the serving cell in which uplink-downlink configuration 0 is set, the PHICH resource is determined in [SFN=m, subframe n=6].

Hereinafter, a downlink HARQ timing will be described in detail.

The downlink reference UL-DL configuration is used to specify (select or determine) correspondence between subframe n in which the PDSCH is arranged and subframe n+k in which the HARQ-ACK corresponding to the PDSCH is transmitted.

FIG. 15 is a diagram illustrating correspondence between subframe n-k in which the PDSCH is arranged and subframe n in which the HARQ-ACK corresponding to the PDSCH is transmitted according to the embodiment. The terminal apparatus 1 specifies (selects or determines) the value of k with reference to the table of FIG. 15. Hereinafter, in the description of FIG. 15, the downlink reference UL-DL configuration is simply referred to as the uplink-downlink configuration.

When the terminal apparatus 1 is a target in subframe n-k (where k is specified by the table of FIG. 15) of the serving cell and the transmission of the PDSCH in which the corresponding HARQ-ACK is to be transmitted is detected, the terminal apparatus 1 transmits the HARQ-ACK in subframe n.

For example, the terminal apparatus 1 makes no response of the HARQ-ACK to the transmission of the PDSCH used for transmission of the system information. For example, the terminal apparatus 1 makes response of the HARQ-ACK to the transmission of the PDSCH scheduled by the DCI format accompanying the CRC scrambled with the C-RNTI.

For example, the terminal apparatus 1 transmits the HARQ-ACK with subframe n=2 in response to the PDSCH received in subframe n-6 and/or n-7 in the serving cell in which uplink-downlink configuration 1 is set.

For the serving cell for which the second information is not received, the downlink reference UL-DL configuration may not be defined. In this case, based on the uplink reference UL-DL configuration (serving cell UL-DL configuration), the terminal apparatus 1 and the base station apparatus 3 may perform a process performed based on the above-described downlink reference UL-DL configuration. The serving cell for which the second information is not received is a serving cell in which the dynamic TDD is not set.

Hereinafter, CSI reporting (report) according to the present invention will be described. Here, a case in which at least two subframe sets are configured in the uplink for performing the CSI reporting is assumed.

Information transmittable with the CSI includes a channel quality indicator (CQI), a rank indicator (RI), a precoding matrix indicator (PMI), and a precoding type indicator (PTI). The CQI expresses a combination of a modulation scheme and a coding rate for a single transport block transmitted with the PDSCH. The coding rate is derived from a resource amount of the PDSCH and a transport block size.

FIG. 16 is a table illustrating examples of a modulation scheme and a coding rate corresponding to a CQI index according to the embodiment. The terminal apparatus 1 derives the CQI index which is transmitted by a downlink physical resource block group called a CSI reference resource, satisfies a condition that a single PDSCH transport block which is a combination of the modulation scheme and the transport block size corresponding to the CQI index may be received at a transport block error probability not exceeding 0.1, and has the highest value among 1 to 15 in the table of FIG. 16. When CQI index 1 does not satisfy the foregoing condition, the terminal apparatus 1 derives CQI index 0. The derived CSI is reported to the base station apparatus 3 by using the PUCCH or the PUSCH through periodic CSI reporting or aperiodic CSI reporting.

Hereinafter, the aperiodic CSI reporting according to the invention will be described.

The aperiodic CSI is transmitted on the PUSCH. When the uplink grant for a serving cell c in subframe n is detected and the CSI report is set to be triggered in the CSI request field included in the uplink grant, the terminal apparatus 1 performs the aperiodic CSI report using the PUSCH scheduled by the uplink grant in subframe n+k in the serving cell c. Here, k is based on a correspondence relation between subframe n in which the PDCCH/EPDCCH/PHICH illustrated in FIG. 12 is arranged and subframe n+k in which the PUSCHs corresponding to the PDCCH/EPDCCH/PHICH are arranged. However, when transmission of uplink data of the PUSCH is not indicated on the basis of the uplink grant, the terminal apparatus 1 can transmit the aperiodic CSI via the PUSCH without the uplink data.

In the CSI request field, information (CSI request) indicating whether the aperiodic CSI report is indicated to the terminal apparatus 1 is mapped. The information indicates the CSI process and/or the subframe set. The terminal apparatus 1 may report the aperiodic CSI in regard to the CSI process and/or the subframe set indicated by the information.

The terminal apparatus 1 derives a wideband CQI and a subband CQI. In the frequency domain, the wideband CQI corresponds to all of the downlink physical resource blocks and the subband CQI corresponds to some of the downlink physical resource blocks.

Hereinafter, the CSI reference resource will be described.

In the frequency domain, the CSI reference resource is defined by a group of the downlink physical resource blocks corresponding to bands with which the derived values of the CQI are associated.

In the time domain, the CSI reference resource is defined by one subframe. When the CSI is reported in subframe n, the CSI reference resource is defined by subframe $n-n_{CQIref}$.

For example, when the CSI is reported in subframe n, $n_{CQIref}$ is the smallest value which corresponds to the subframe in which the subframe $n-n_{CQIref}$ is enabled and which is greater than m or is equal to m. For example, m is 4 or 5. For example, when the aperiodic CSI is reported, the CSI reference resource is a valid subframe in which the corresponding CSI request is received.

When the transmission of the PUSCH with the uplink data is initial transmission or retransmission and is retransmission, a method of calculating the number Q' of modulation symbols (modulation coded symbols) used for transmission of CQI and/or PMI (hereinafter referred to as CQI/PMI) in the information transmitted through the CSI reporting is different according to a combination of the classification of the subframe set used in the initial transmission and the subframe set used in the current transmission.

In a case of the initial transmission or retransmission of the uplink data with the CQI/PMI, and in a case that the subframe set for the initial transmission of the uplink data (the subframe set to which the subframe of the initial transmission belongs) and the subframe set for the current retransmission of the uplink data (the subframe set to which the subframe(s) of the retransmission belongs) are the same, the number Q' of modulation symbols is calculated using Equation 1 of the following equation.

$$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, \right. \tag{Eq. 1}$$

$$\left. M_{sc}^{PUSCH} \cdot N_{symb}^{PUSCH} - \frac{Q_{RI}^{(x)}}{Q_m^{(x)}} \right)$$

Here, min(•) is a function of selecting the minimum number in the parentheses. O is the number of bits of the CQI/PMI input from a higher layer and L is a value of the CRC bit based on the value of O. For example, L is configured to 0 when O is equal to or less than 11. L is configured to 8 when L is equal to or greater than 12. Further, x is an index of uplink data in which an index $I_{MCS}$ of MCS indicated via the uplink grant corresponding to the initial transmission of the uplink data is the highest among the uplink data transmitted on the PUSCH with the CQI/PMI when each of the plurality of uplink data are simultaneously transmitted. The uplink data is also referred to as uplink data x or is simply referred to as uplink data. Here, x=1 when the same value of the $I_{MCS}$ is indicated by the uplink grants for two pieces of uplink data. $M^{PUSCH\text{-}initial(x)}{}_{SC}$ indicates a bandwidth scheduled for the initial transmission of the PUSCH for the uplink data x transmitted on the PUSCH with the CQI/PMI and is expressed by the number of subcarriers. $N^{PUSCH\text{-}initial(x)}{}_{symb}$ indicates the number of SC-FDMA symbols in the subframe for the initial transmission of the PUSCH with the uplink data x transmitted on the PUSCH with the CQI/PMI. $K^{(x)}{}_r$ indicates a sum of a payload size A of the uplink data x transmitted on the PUSCH and the sequence length of a cyclic redundancy check code added to the uplink data. $M^{PUSCH}{}_{SC}$ indicates the bandwidth scheduled for transmission of the PUSCH in the current subframe for the uplink data transmitted on the PUSCH with the CQI and is expressed by the number of subcarriers. $N^{PUSCH}{}_{symb}$ indicates the number of SC-FDMA symbols in the current subframe for the transmission on the PUSCH of the uplink data transmitted on the PUSCH with the CQI/PMI. $Q^{(x)}{}_{RI}$ indicates the number of modulation symbols used for transmission of RI. $Q^{(x)}{}_m$ is a modulation order used for modulation of the CQI/PMI and the RI.

Here, $\beta^{PUSCH}{}_{offset}$ is an offset value which is configured for each terminal apparatus 1 by the base station apparatus 3 and is configured using a radio resource control signal (RRC signal) of which the base station apparatus 3 notifies the terminal apparatus 1. Here, the RRC signal is also referred to as an RRC message, RRC information elements, or a higher layer signal (higher layer signaling). The terminal apparatus 1 calculates Q' by applying the configured $\beta^{PUSCH}{}_{offset}$ to Equation 1. That is, the number of modulation symbols used for transmission of the CQI/PMI is determined by $\beta^{PUSCH}{}_{offset}$. That is, a coding rate of the CQI/PMI is determined by $\beta^{PUSCH}{}_{offset}$ (the modulation and the coding scheme of the CQI/PMI may be determined). However, when $\beta^{PUSCH}{}_{offset}$ is not configured by the RRC signal, a predefined value is used.

When the uplink data is retransmitted along with the CQI/PMI and the subframe set used for the initial transmission of the uplink data is different from the subframe set used for the current retransmission of the uplink data, the number Q' of modulation symbols is calculated using Equation 2 of the following equation.

$$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH} \cdot \gamma_{offset}}{\sum_{r=0}^{C^{(x)}-1} K_r^{(x)}} \right\rceil, \right. \tag{Eq. 2}$$

$$\left. M_{sc}^{PUSCH} \cdot N_{symb}^{PUSCH} - \frac{Q_{RI}^{(x)}}{Q_m^{(x)}} \right)$$

Here, $\gamma_{offset}$ is a second offset value of which the base station apparatus 3 notifies the terminal apparatus 1 using a radio resource control signal (RRC) or the like. The terminal apparatus 1 calculates Q' by applying $\beta^{PUSCH}{}_{offset}$ and $\gamma_{offset}$ configured by the base station apparatus 3 to Equation 2.

When the value of $\gamma_{offset}$ is 1 from a relation between Equations 1 and 2, Equations 1 and 2 become the same Equation. Q' is determined without dependence on the subframe set used for the transmission of the CQI/PMI. The value of Q' is calculated as different values between a case in which the uplink data is retransmitted and the subframe set used for the initial transmission of the uplink data is different from the subframe set used for the current retransmission of the uplink data and the other cases when the value of $\gamma_{offset}$ is a value other than 1.

Here, $\gamma_{offset}$ is offset to configure a coding rate appropriate for ensuring reception quality of the CQI/PMI in the base station apparatus 3 when the subframe set used for the initial transmission of the uplink data transmitted together at the time of the transmission of the CQI/PMI in the PUSCH is different from the subframe set used for the current uplink data.

Here, $\gamma_{offset}$ is configured to be a different value according to the subframe set used for the initial transmission of the uplink data together transmitted in the PUSCH at the time of the transmission of the CQI/PMI. A case in which two kinds of first and second subframe sets are configured will be exemplified. When the subframe set used for the initial transmission of the uplink data is the first subframe set and the retransmission of the uplink data and the transmission of the CQI/PMI are simultaneously performed on the PUSCH in the second subframe set, "$\gamma_{offset}=\gamma_{1,2}$" is configured. When the subframe set used for the initial transmission of the uplink data is the second subframe set and the retransmission of the uplink data and the transmission of the CQI/PMI are simultaneously performed on the PUSCH in the first subframe set, "$\gamma_{offset}=\gamma_{2,1}$" is configured. The base station apparatus 3 may notify the terminal apparatus 1 of such $\gamma_{1,2}$ and $\gamma_{2,1}$ with the RRC signals.

Here, only $\gamma_{1,2}$ may be notified of and a form of "$\gamma_{2,1}=1/\gamma_{1,2}$" may be set. That is, $\gamma_{2,1}$ may be a reciprocal of $\gamma_{1,2}$.

Alternatively, when the uplink data is retransmitted along with the CQI/PMI and the subframe set used for the initial transmission of the uplink data is different from the subframe set used for the current retransmission of the uplink data, the number Q' of modulation symbols is calculated using Equations 3 and 4 of the following equations rather than the foregoing Equation 2.

$$Q' = \min\left(\left\lceil\frac{(O+L) \cdot M_{sc}^{PUSCH-initial(x)} \cdot N_{symb}^{PUSCH-initial(x)} \cdot \beta_{offset,2}^{PUSCH}}{\sum_{r=0}^{C^{(x)}-1} K_r^{(x)}}\right\rceil, \right.$$

[Eq. 3]

$$\left. M_{sc}^{PUSCH} \cdot N_{symb}^{PUSCH} - \frac{Q_{RI}^{(x)}}{Q_m^{(x)}}\right)$$

$$Q' = \min\left(\left\lceil\frac{(O+L) \cdot M_{sc}^{PUSCH-initial(x)} \cdot N_{symb}^{PUSCH-initial(x)} \cdot \beta_{offset,3}^{PUSCH}}{\sum_{r=0}^{C^{(x)}-1} K_r^{(x)}}\right\rceil, \right.$$

[Eq. 4]

$$\left. M_{sc}^{PUSCH} \cdot N_{symb}^{PUSCH} - \frac{Q_{RI}^{(x)}}{Q_m^{(x)}}\right)$$

When the subframe set used for the initial transmission of the uplink data is the first subframe set and the retransmission of the uplink data and the transmission of the CQI/PMI are simultaneously performed on the PUSCH in the second subframe set, Q' is calculated using Equation 3. When the subframe set used for the initial transmission of the uplink data is the second subframe set and the retransmission of the uplink data and the transmission of the CQI/PMI are simultaneously performed on the PUSCH in the first subframe set, Q' is calculated using Equation 4.

Accordingly, when Q' is calculated using Equation 1, 3, and 4, the base station apparatus 3 notifies the terminal apparatus 1 of three values, $\beta^{PUSCH}_{offset}$, $\beta^{PUSCH}_{offset,2}$, and $\beta^{PUSCH}_{offset,3}$, as offsets via the RRC signals. When the uplink data is initially transmitted along with the CQI/PMI or when the uplink data is retransmitted along with the CQI/PMI and the subframe set used for the initial transmission of the uplink data is the same as the subframe set used for the current retransmission of the uplink data, $\beta^{PUSCH}_{offset}$ is configured in the offset (Q' is calculated using Equation 1). When the subframe set used for the initial transmission of the uplink data is the first subframe set and the retransmission of the uplink data and the transmission of the CQI/PMI are simultaneously performed on the PUSCH in the second subframe set, $\beta^{PUSCH}_{offset,2}$ is configured in the offset (Q' is calculated using Equation 3). When the subframe set used for the initial transmission of the uplink data is the second subframe set and the retransmission of the uplink data and the transmission of the CQI/PMI are simultaneously performed on the PUSCH in the first subframe, $\beta^{PUSCH}_{offset,3}$ is configured in the offset (Q' is calculated using Equation 4).

Here, in the foregoing examples, the plurality of equations, Equations 1, 3, and 4 have been described. However, these equations may be unified to be expressed as Equation 5.

$$Q' = \min\left(\left\lceil\frac{(O+L) \cdot M_{sc}^{PUSCH-initial(x)} \cdot N_{symb}^{PUSCH-initial(x)} \cdot \beta_{offset}}{\sum_{r=0}^{C^{(x)}-1} K_r^{(x)}}\right\rceil, \right.$$

[Eq. 5]

$$\left. M_{sc}^{PUSCH} \cdot N_{symb}^{PUSCH} - \frac{Q_{RI}^{(x)}}{Q_m^{(x)}}\right)$$

For $B_{offset}$, "$B_{offset}=\beta^{PUSCH}_{offset}$" is configured when the uplink data is initially transmitted along with the CQI/PMI or when the uplink data is retransmitted along with the CQI/PMI and the subframe set used for the initial transmission of the uplink data is the same as the subframe set used for the current retransmission of the uplink data. "$B_{offset}=\beta^{PUSCH}_{offset,2}$" is configured when the subframe set used for the initial transmission of the uplink data is the first subframe set and the retransmission of the uplink data and the transmission of the CQI/PMI are simultaneously performed on the PUSCH in the second subframe set. "$B_{offset}=\beta^{PUSCH}_{offset,3}$" ft is configured when the subframe set used for the initial transmission of the uplink data is the second subframe set and the retransmission of the uplink data and the transmission of the CQI/PMI are simultaneously performed on the PUSCH in the first subframe set.

Here, in the foregoing example, the case in which the subframe sets are two kinds of subframe sets has been described. However, even when the subframe sets are three or more kinds of subframe sets, the same can be realized by increasing the number of offsets which are notified of via the RRC signal.

Here, when the value of the offset used to calculate the number of modulation symbols of the CQI/PMI is configured, as described above, the terminal apparatus 1 necessarily stores the subframe set used for the initial transmission of the uplink data and necessarily specifies the value of the offset according to the subframe set used for the retransmission of the uplink data along with the stored subframe set and the CQI/PMI. On the other hand, the terminal apparatus 1 may specify (configure) the value of the offset based on the subframe set for the transmission of the CQI/PMI without dependence on the subframe set for the initial transmission of the uplink data. In this case, the terminal apparatus 1 can calculate the number of modulation symbols of the CQI/PMI using, for example, Equation 6.

$$Q' = \min\left(\left\lceil\frac{(O+L) \cdot M_{sc}^{PUSCH-initial(x)} \cdot N_{symb}^{PUSCH-initial(x)} \cdot \beta'_{offset}}{\sum_{r=0}^{C^{(x)}-1} K_r^{(x)}}\right\rceil, \right.$$

[Eq. 6]

-continued $$\left. M_{sc}^{PUSCH} \cdot N_{symb}^{PUSCH} - \frac{Q_{RI}^{(x)}}{Q_m^{(x)}} \right\}$$

Here, for B'$_{offset}$, "B$_{offset}$=$\beta^{PUSCH}_{offset,1}$" is configured when the CQI/PMI is transmitted on the PUSCH in the first subframe set, and "B$_{offset}$=$\beta^{PUSCH}_{offset,2}$" is configured when the CQI/PMI is transmitted on the PUSCH in the second subframe set. Here, $\beta^{PUSCH}_{offset,1}$ and $\beta^{PUSCH}_{offset,2}$ are the values of the offsets configured by the RRC signal from the base station apparatus 3. Thus, by allowing the values of the offsets configured on the basis of the subframe sets for the transmission of the CQI/PMI to be different values, it is possible to configure the appropriate number of modulation symbols of the CQI/PMI according to channel characteristics different for each subframe set.

Here, for B'$_{offset}$ in Equation 6, the independent values have been configured according to the two kinds of first and second subframe sets. However, when three or more kinds of subframe sets are configured, a value may be configured for each subframe set.

On the other hand, the base station apparatus 3 can determine the subframe set in which the uplink data is initially transmitted based on the timing at which the uplink data is received from the terminal apparatus 1. Further, the base station apparatus 3 can specify the subframe set of the subframes in which the CSI/PMI is received on the basis of the transmission timing of the uplink grant making the CSI request to the terminal apparatus 1. That is, when the base station apparatus 3 transmits the CSI request, the base station apparatus 3 can specify the initial transmission or the retransmission of the uplink data with the CQI/PMI in the PUSCH, and specify the appropriate value of the offset which is used for the terminal apparatus 1 to calculate the number of modulation symbols of the CQI/PMI according to the combination of the subframe set used for the initial transmission of the uplink data and the subframe set used for the current retransmission of the uplink data at the time of the retransmission of the uplink data. Accordingly, when the base station apparatus 3 transmits the CSI request using a plurality of bits and designates the value of the offset according to the combination of the plurality of bits, the terminal apparatus 1 can configure the value of the offset without dependence on the kinds of subframe sets at the time of the initial transmission and the retransmission of the uplink data.

FIG. 17 illustrates examples of the values of the offsets $\beta^{PUSCH}_{offset}$ when a 3-bit CSI request field is used. Here, the terminal apparatus 1 is assumed to derive the number Q' of modulation symbols (modulation coded symbols) used to transmit the CQI/PMI using Equation 1. The value "000" of the CSI field is used when the base station apparatus 3 does not request the terminal apparatus 1 to transmit the CSI and it is not necessary to configure $\beta^{PUSCH}_{offset}$. When the value of the CSI field is "001", the terminal apparatus 1 sets a first value configured by the higher layer to $\beta^{PUSCH}_{offset}$. Likewise, when the value of the CSI field is "010", "011", "100", "101", "110", and "111", the terminal apparatus 1 sets a second value, a third value, a fourth value, a fifth value, a sixth value, and a seventh value configured by the higher layer to $\beta^{PUSCH}_{offset}$, respectively. Here, the first value to the seventh value may not necessarily be different values and some of the values may be the same.

Here, when the CSI field with a plurality of bits is used, the values of the offsets and other pieces of information may be combined and configured. For example, when a plurality of serving cells are used in the downlink and the CSI is derived by selection from the plurality of serving cells, and/or when there are a plurality of processes transmitting the CSI, and/or when there are a plurality of subframe sets used in the downlink, the downlink serving cells deriving the CSI, the CSI processes, and triggers of the subframe sets may correspond to the CSI request field with the plurality of bits. FIG. 18 illustrates combinations of the serving cells in which an aperiodic CSI is triggered, the CSI processes, and the subframe sets and examples of the values of the offsets used for the calculation of the number of modulation symbols of the CQI/PMI according to the values of the 3-bit CSI fields. When the value of the CSI field is "000", the base station apparatus 3 does not request the terminal apparatus 1 to report the CSI and $\beta^{PUSCH}_{offset}$ is not configured. When the value of the CSI field is "001", the base station apparatus 3 requests the terminal apparatus 1 to report a periodic CSI of a serving cell c used to transmit the aperiodic CSI and configures $\beta^{PUSCH}_{offset}$ to be used for the calculation of the number of modulation symbols of the CQI/PMI in this case as a first value configured by a higher layer. Here, the CSI process and/or the subframe set which are reported are configured by the higher layer. When the values of the CSI field are "010" to "111", the base station apparatus 3 requests the terminal apparatus 1 to report the aperiodic CSI and configures $\beta$ $\beta^{PUSCH}_{offset}$ to be used for the calculation of the number of modulation symbols of the CQI/PMI in this case as second to seventh values configured by the higher layers, respectively. Here, the serving cells, and/or the CSI processes, and/or the subframe sets to be reported when the CSI field is "010" to "111" are first to sixth sets configured by the higher layers.

Here, in FIG. 18, the serving cell to be reported when the value of the CSI field is "001" has been the serving cell c used to transmit the aperiodic CSI. However, the higher layer may be configured as in the cases of "010" to "111".

Here, in FIG. 18, when the values of the CSI field is "010" to "111", the combinations of the serving cells in which the aperiodic CSI is triggered, the CSI processes, and the subframe sets have been described as the first to sixth sets, but some of the sets may be defined to be the same set. For example, when the value of the CSI field is "011", the report of the aperiodic CSI in regard to the first set may be defined to be triggered.

Here, in FIG. 18, $\beta^{PUSCH}_{offset}$ used for the calculation of the number of modulation symbols of the CQI/PMI when the values of the CSI field is "001" to "111" has been the first to seventh values configured by the higher layers, but some of the values may be defined to be designated as the same value. For example, $\beta^{PUSCH}_{offset}$ used when the value of the CSI field is "111" may be defined to be the same as the first value configured by the higher layer. In this case, it is not necessary to configure the seventh value by the higher layer.

Here, in FIG. 18, $\beta^{PUSCH}_{offset}$ used for the calculation of the number of modulation symbols of the CQI/PMI when the values of the CSI field are "001" to "111" has been the first to seventh values configured by the higher layers, but some of the values may be defined to be designated as reciprocals thereof. For example, $\beta^{PUSCH}_{offset}$ used when the value of the CSI field is "110" may be defined to be the reciprocal of the first value configured by the higher layer. In this case, it is not necessary to configure the sixth value by the higher layer.

When the uplink control information is sent via the PUSCH, a transmit power for the PUSCH is set based on $\Delta_{TF}$. When delta modulation and coding scheme (MCS) is enabled, $\Delta_{TF}$ is expressed by Equation 7. Further, when the delta MCS is enabled, the delta MCS is used as "Ks=1.25".

$$\Delta_{TF,c}(i)=10\ \log_{10}((2^{BPRE \cdot Ks}-1) \cdot \beta_{offset}^{PUSCH}) \qquad [\text{Eq. 7}]$$

A bit per resource element (BPRE) is the number of bits of the CQI/PMI per resource element. Further, the BPRE is set on the basis of Equation 8 when transmission of the PUSCH with the uplink control information and without the transport block is scheduled.

$$BPRE = O_{CQI}/N_{RE} \qquad [\text{Eq. 8}]$$

In the other cases, the BPRE is set on the basis of Equation 9.

$$BPRE = \sum_{r=0}^{C-1} K_r / N_{RE} \qquad [\text{Eq. 9}]$$

C is the number of code blocks, $K_r$ is the size of a code block r, $O_{CQI}$ is the number of bits of the CQI/PMI including the CRC bits, and the $N_{RE}$ is the number of resource elements, which are defined with Equation 10.

$$N_{RE} = M_{sc}^{PUSCH\text{-}initial} \cdot N_{symb}^{PUSCH\text{-}initial} \qquad [\text{Eq. 10}]$$

$M^{PUSCH\text{-}initial}_{SC}$ and $N^{PUSCH\text{-}initial}_{symbol}$ are the number of subcarriers of the PUSCH allocated at the time of the initial transmission and the number of SC-FDMA symbols in one subframe.

The definitions of the parameters used in Equation 7 to Equation 10 may be the same as those of the parameters used in Equation 1 to Equation 6.

When the delta MCS is enabled, and when the transmission of the PUSCH with the uplink control information and without the transport block (the UL-SCH data, the uplink data) is scheduled via the DCI format, the terminal apparatus 1 may configure the value of the beta offset $\beta^{PUSCH}_{offset}$ on the basis of the value of the offset used when the PUSCH with the uplink control information and the retransmitted transport block is transmitted in the same subframe set as the subframe set in which the initial transmission of the transport block is performed.

When the delta MCS is enabled, and when the transmission of the PUSCH with the uplink control information and without the transport block is scheduled via the DCI format, the terminal apparatus 1 may configure the value of the beta offset $\beta^{PUSCH}_{offset}$ on the basis of the value of the offset which corresponds to the value of the CSI request field. For example, in the case based on FIG. 18, the terminal apparatus 1 may configure the value of the beta offset $\beta^{PUSCH}_{offset}$ included in Equation 7 on the basis of one of the first to seventh values which correspond to the values of the CSI request field.

When the delta MCS is enabled and the transmission of the PUSCH with the uplink control information and without the transport block in the DCI format is scheduled, and when the delta MCS is enabled and the transmission of the PUSCH is performed in the subframes belonging to the first subframe set, the terminal apparatus 1 may set the transmit power for the PUSCH on the basis of the value of the offset configured for the first subframe set. Further, when the delta MCS is enabled and the transmission of the PUSCH is performed in the subframes belonging to the second subframe set, the terminal apparatus 1 may configure the value of the beta offset $\beta^{PUSCH}_{offset}$ on the basis of the value of the offset configured for the second subframe set. For example, based on B'$_{offset}$ included in Equation 6, the value of the beta offset $\beta^{PUSCH}_{offset}$ included in Equation 7 may be configured.

When the delta MCS is enabled and the transmission of the PUSCH with the uplink control information and without the transport block is scheduled via the DCI format, the terminal apparatus 1 may configure a predetermined value (1, 2, 3, . . . ) in the beta offset $\beta^{PUSCH}_{offset}$.

When the delta MCS is disabled, the terminal apparatus 1 may set the transmit power as "$\Delta_{TF}$=0". That is, when the delta MCS is disabled (Ks=0), the terminal apparatus 1 may set the transmit power without consideration of the value of the beta offset $\beta^{PUSCH}_{offset}$. When the delta MCS is disabled, the delta MCS is used as "Ks=0".

Figure 19:
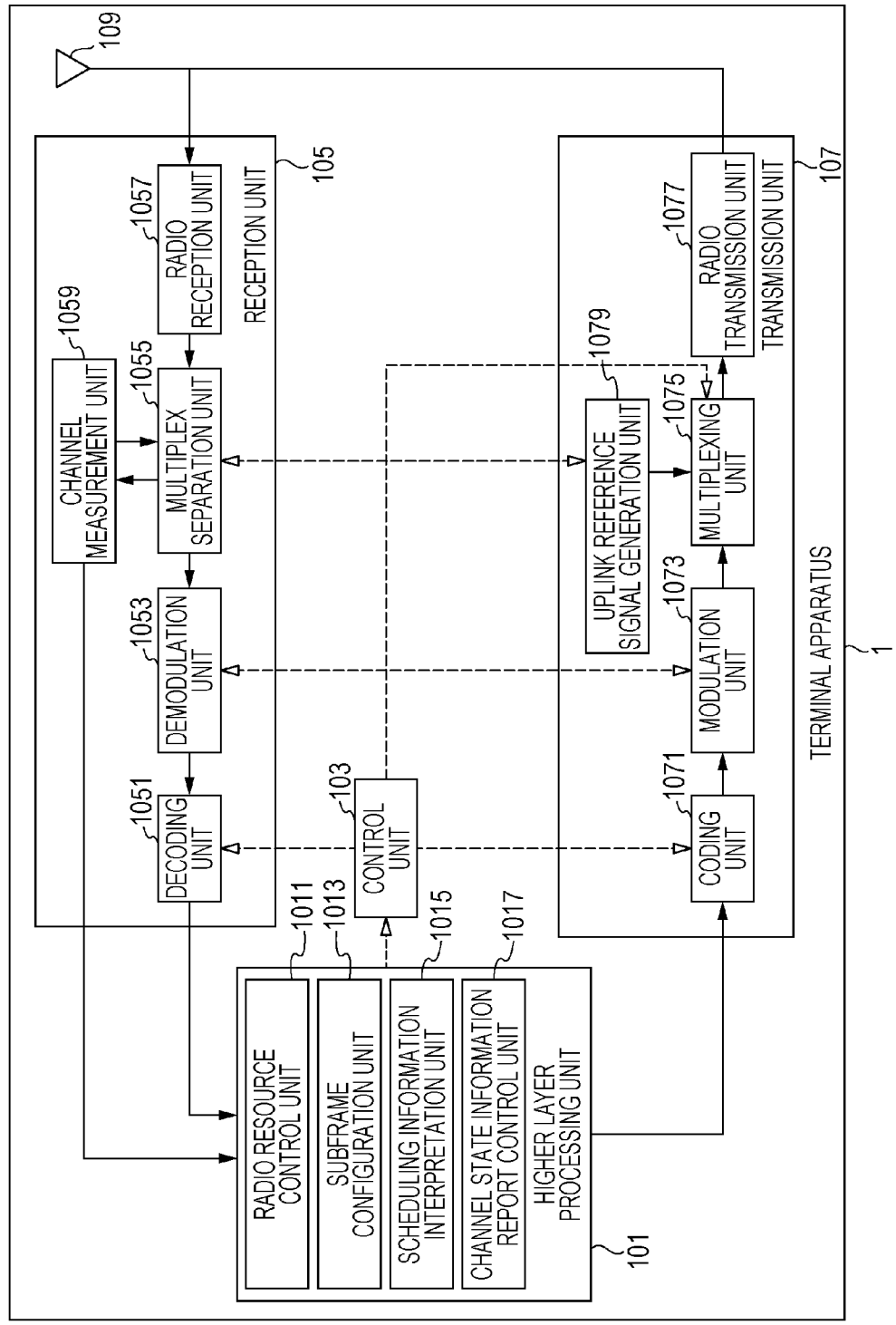
FIG. 19 is a schematic block diagram illustrating the structure of a terminal apparatus 1 according to the embodiment.

FIG. 19 is a schematic block diagram illustrating the structure of the terminal apparatus 1 according to the embodiment. As illustrated, the terminal apparatus 1 includes a higher layer processing unit 101, a control unit 103, a reception unit 105, a transmission unit 107, and a transmission/reception antenna 109. The higher layer processing unit 101 includes a radio resource control unit 1011, a subframe configuration unit 1013, a scheduling information interpretation unit 1015, and a channel state information (CSI) report control unit 1017. The reception unit 105 includes a decoding unit 1051, a demodulation unit 1053, a multiplex separation unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs the uplink data (transport block) generated through a user's operation or the like to the transmission unit 107. The higher layer processing unit 101 performs processes for a medium access control (MAC) layer, a packet data convergence protocol (PDCP) layer, a radio link control (RLC) layer, and a radio resource control (RRC) layer.

The radio resource control unit 1011 included in the higher layer processing unit 101 manages various kinds of configuration information of the terminal apparatus. The radio resource control unit 1011 generates information arranged in each uplink channel and outputs the information to the transmission unit 107.

The subframe configuration unit 1013 included in the higher layer processing unit 101 manages the uplink reference UL-DL configuration, the downlink reference UL-DL configuration, and the transmission direction UL-DL configuration. The subframe configuration unit 1013 sets the uplink reference UL-DL configuration, the downlink reference UL-DL configuration, and the transmission direction UL-DL configuration. The subframe configuration unit 1013 sets at least two subframe sets.

The scheduling information interpretation unit 1015 included in the higher layer processing unit 101 analyzes the DCI format (scheduling information) received via the reception unit 105, generates control information to control the reception unit 105 and the transmission unit 107 based on the analysis result of the DCI format, and outputs the control information to the control unit 103.

The scheduling information interpretation unit 1015 determines timings at which a transmission process and a reception process are performed based on the uplink reference UL-DL configuration, the downlink reference UL-DL configuration, and/or the transmission direction UL-DL configuration.

The CSI report control unit 1017 specifies the CSI reference resource. The CSI report control unit 1017 indicates the channel measurement unit 1059 to derive the CQI associated with the CSI reference resource. The CSI report control unit 1017 indicates the transmission unit 107 to transmit the CQI. The CSI report control unit 1017 sets the configuration used when the channel measurement unit 1059 calculates the CQI.

The control unit 103 generates control signals used to control the reception unit 105 and the transmission unit 107 based on the control information from the higher layer processing unit 101. The control unit 103 outputs the generated control signals to the reception unit 105 and the transmission unit 107 to control the reception unit 105 and the transmission unit 107.

The reception unit 105 separates, demodulates, and decodes a received signal received from the base station apparatus 3 via the transmission/reception antenna 109 according to the control signal input from the control unit 103 and outputs decoded information to the higher layer processing unit 101.

The radio reception unit 1057 converts (downconverts) a downlink signal received via the transmission/reception antenna 109 into a baseband signal through quadrature demodulation, removes an unnecessary frequency component, controls an amplification level so that the signal level is appropriately maintained, performs the quadrature demodulation based on an in-phase component and a quadrature component of the received signal, and converts the analog signal subjected to the quadrature demodulation into a digital signal. The radio reception unit 1057 removes a portion corresponding to the cyclic prefix (CP) from the converted digital signal and performs fast Fourier transform (FFT) on the signal from which the CP is removed to extract a signal of the frequency domain.

The multiplex separation unit 1055 separates the extracted signal into the PHICH, the PDCCH, the EPDCCH, the PDSCH, and the downlink reference signal. The multiplex separation unit 1055 compensates channels of the PHICH, the PDCCH, the EPDCCH, and the PDSCH from estimated values of the channels input from the channel measurement unit 1059. The multiplex separation unit 1055 outputs the separated downlink reference signal to the channel measurement unit 1059.

The demodulation unit 1053 multiplies a corresponding code to the PHICH to combine the code, demodulates the combined signal according to the binary phase shift keying (BPSK) modulation scheme, and outputs the demodulated signal to the decoding unit 1051. The decoding unit 1051 decodes the PHICH for the terminal apparatus and outputs the decoded HARQ indicator to the higher layer processing unit 101. The demodulation unit 1053 demodulates the PDCCH and/or the EPDCCH according to the QPSK demodulation scheme and outputs the demodulated signal to the decoding unit 1051. The decoding unit 1051 attempts to decode the PDCCH and/or the EPDCCH. When the decoding unit 1051 succeeds the decoding, the decoding unit 1051 outputs decoded downlink control information and the RNTI corresponding to the downlink control information to the higher layer processing unit 101.

The demodulation unit 1053 performs demodulation on the PDSCH according to a demodulation scheme notified of with the downlink grant, such as the quadrature phase shift keying (QPSK), 16 quadrature amplitude modulation (QAM), or 64 QAM and outputs the demodulated result to the decoding unit 1051. The decoding unit 1051 performs decoding based on information regarding the encoding rate notified of with the downlink control information and outputs the decoded downlink data (transport block) to the higher layer processing unit 101.

The channel measurement unit 1059 measures a path loss or a channel state of the downlink on the basis of the downlink reference signal input from the multiplex separation unit 1055 and outputs the measured path loss or channel state to the higher layer processing unit 101. The channel measurement unit 1059 calculates an estimated value of the downlink channel from the downlink reference signal and outputs the estimated value to the multiplex separation unit 1055. The channel measurement unit 1059 performs channel measurement and/or interference measurement to calculate the CQI.

The transmission unit 107 generates an uplink reference signal according to the control signal input from the control unit 103, codes and modulates the uplink data (transport block) input from the higher layer processing unit 101, multiplexes the PUCCH, the PUSCH, and the generated uplink reference signal, and transmits the multiplexed PUCCH, PUSCH, and uplink reference signal to the base station apparatus 3 via the transmission/reception antenna 109.

The transmission unit 107 sets the transmit power for each of the PUCCH, the PUSCH, and the generated uplink reference signal.

Figure 20:
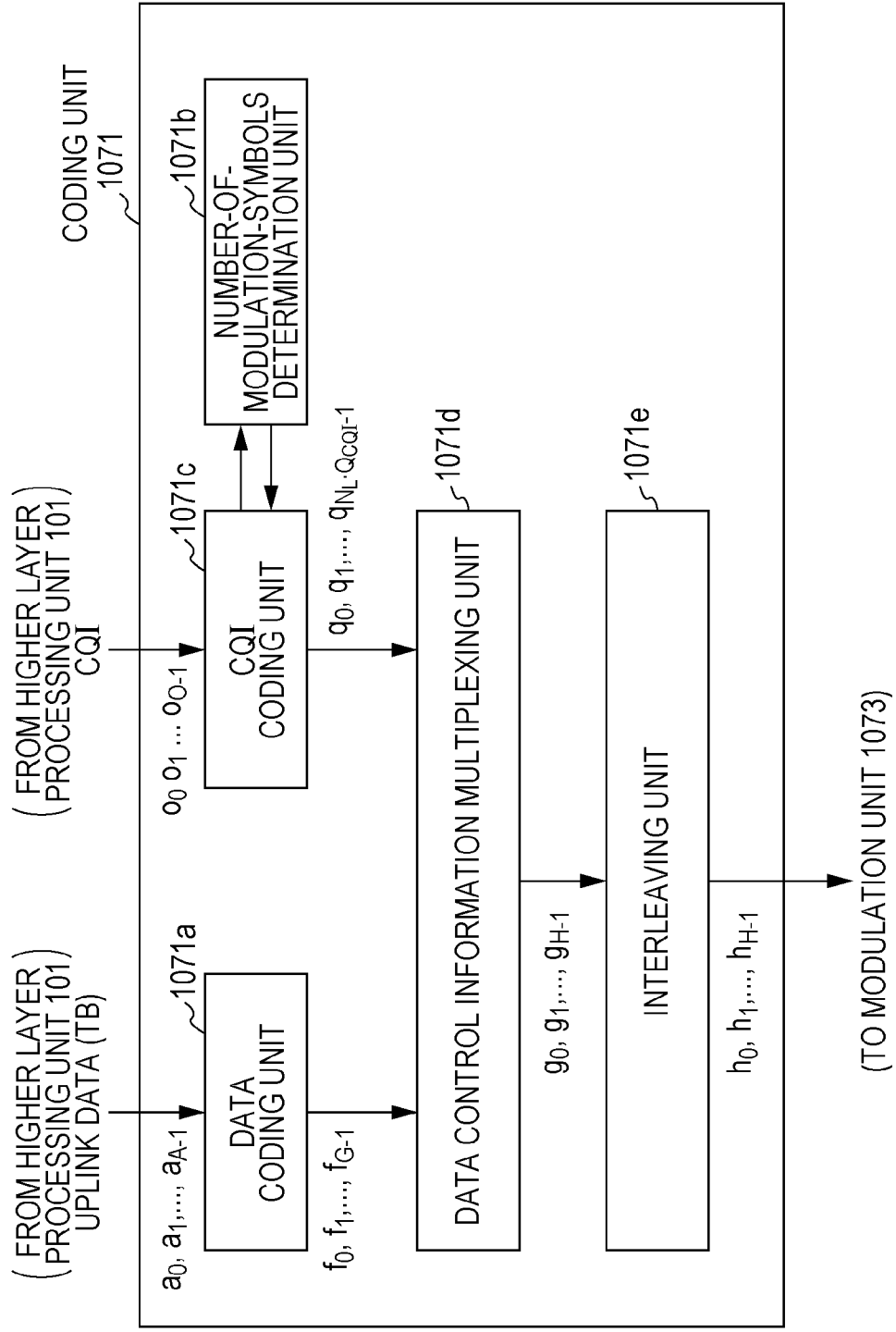
FIG. 20 is a schematic block diagram illustrating the structure of a coding unit 1071 according to the embodiment.

The coding unit 1071 codes the uplink control information and the uplink data input from the higher layer processing unit 101 and outputs the uplink control information and the uplink data to the modulation unit 1073. FIG. 20 is a schematic block diagram illustrating the structure of the coding unit 1071 according to the present invention. The coding unit 1071 includes a data coding unit 1071a, a number-of-modulation-symbols determination unit 1071b, a CQI coding unit 1071c, a data and control information multiplexing unit 1071d, and an interleaving unit 1071e.

The data coding unit 1071a adds the cyclic redundancy check code to A-bit uplink data of $a_i$ uplink ($0 \le i \le A-1$) input from the higher layer 101 based on the uplink grant received from the base station apparatus 3, perform error correction coding, and outputs coded bits $f_j$ ($0 \le j \le G-1$) of G-bit uplink data generated through rate matching to the data control information multiplexing unit 1071d.

The number-of-modulation-symbols determination unit 1071b determines the number Q' of modulation symbols used for the transmission of the CQI/PMI coded in the CQI coding unit 1071c. Here, the Q' calculation method has been described above. The number-of-modulation-symbols determination unit 1071b outputs the calculated Q' to the CQI coding unit 1071c.

The CQI coding unit 1071c codes CQI bits $o_k$ ($0 \le k \le O-1$) of O bits input from the higher layer processing unit 101 and outputs coded CQI bits $q_l$ ($0 \le l \le N_L \cdot Q_{CQI}-1$) to the data control information multiplexing unit 1071d. Here, the number $N_L \cdot Q_{CQI}$ of bits after the coding is calculated using Q' input from the number-of-modulation-symbols determination unit 1071b, $Q_{CQI}=Q(x)_m \times Q'$, and $N_L$ is the number of layers used for the transmission.

The coded bit $f_j$ of the uplink data and the coded bit $q_l$ of the CQI are input to the data control information multiplexing unit 1071d. Then, the data control information multiplexing unit 1071d multiplexes these bits and outputs H-bit coded bits $g_n$ ($0 \le n \le H-1$) to the interleaving unit 1071e. Here, $H=G+N_L \cdot Q_{CQI}$.

The interleaving unit 1071e interleaves the coded bits $g_n$ input from the data control information multiplexing unit 1071d and outputs the interleaved bits to the modulation unit 1073. Here, in FIG. 20, the example in which the interleaving is performed on only the multiplexed uplink data and the coded bits of the CQI/PMI has been described. However, the interleaving may be performed after the coded bits of the HARQ-ACK, the RI included in the CSI, or the like are connected. A different calculation method can also be applied for each subframe set to the number of modulation symbols used in the coded bits of the connected RI or HARQ-ACK, as in the case of the CQI/PMI indicated in the present invention.

The modulation unit 1073 modulates the coded bits input from the coding unit 1071 according to a modulation scheme notified of with the downlink control information, such as the BPSK, the QPSK, the 16 QAM, or the 64 QAM or a modulation scheme determined in advance for each channel. The modulation unit 1073 determines the number of sequences of spatially multiplexed data based on the information used for the scheduling of the PUSCH, maps the plurality of pieces of uplink data transmitted with the same PUSCH to the plurality of sequences by using multiple input multiple output (MIMO) Spatial Multiplexing (SM), and performs precoding on the sequence.

The uplink reference signal generation unit 1079 generates a sequence obtained by a rule (equation) determined in advance based on a physical cell identity (PCI: referred to as a Cell ID or the like) for identifying the base station apparatus 3, a bandwidth in which the uplink reference signal is arranged, a cyclic shift notified of with the uplink grant, the values of parameters for generation of a DMRS sequence, and the like. The multiplexing unit 1075 sorts the modulation symbols of the PUSCH in parallel according to the control signal input from the control unit 103, and then performs discrete Fourier transform (DFT). The multiplexing unit 1075 multiplexes the signals of the PUCCH and the PUSCH and the generated uplink reference signal for each transmission antenna port. That is, the multiplexing unit 1075 arranges the signals of the PUCCH and the PUSCH and the generated uplink reference signal in the resource element for each transmission antenna port.

The radio transmission unit 1077 performs inverse fast Fourier transform (IFFT) on the multiplexed signals, generates the SC-FDMA symbols, adds the CP to the generated SC-FDMA symbols, generates a baseband digital signal, converts the baseband digital signal into an analog signal, removes an excessive frequency component using a low-pass filter, performs upconverting on a carrier frequency, performs power amplification, and outputs the signal to the transmission/reception antenna 109 to transmit the signal.

Figure 21:
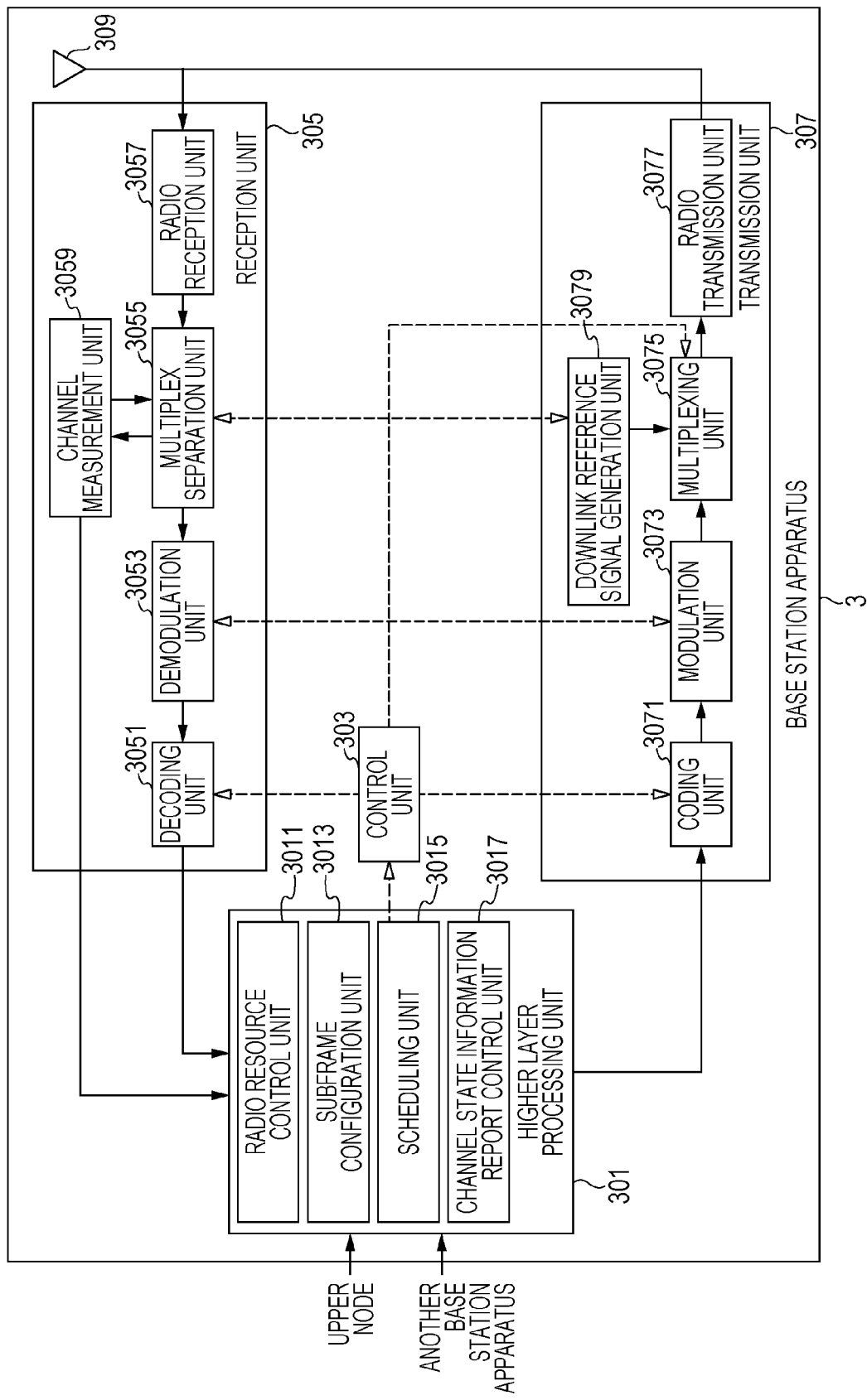
FIG. 21 is a schematic block diagram illustrating the structure of a base station apparatus 3 according to the embodiment.

FIG. 21 is a schematic block diagram illustrating the structure of the base station apparatus 3 according to the embodiment. As illustrated, the base station apparatus 3 includes a higher layer processing unit 301, a control unit 303, a reception unit 305, a transmission unit 307, and a transmission/reception antenna 309. The higher layer processing unit 301 includes a radio resource control unit 3011, a subframe configuration unit 3013, a scheduling unit 3015, and a CSI report control unit 3017. The reception unit 305 includes a decoding unit 3051, a demodulation unit 3053, a multiplex separation unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The higher layer processing unit 301 performs processes for a medium access control (MAC) layer, a packet data convergence protocol (PDCP) layer, a radio link control (RLC) layer, and a radio resource control (RRC) layer. The higher layer processing unit 301 generates control information to control the reception unit 305 and the transmission unit 307 and outputs the control information to the control unit 303.

The radio resource control unit 3011 included in the higher layer processing unit 301 generates the downlink data (transport block) arranged in the downlink PDSCH, the system information, the RRC message, the MAC CE (Control Element), and the like or acquires the downlink data, the system information, the RRC message, the MAC CE, and the like from a higher node, and then outputs the downlink data, the system information, the RRC message, the MAC CE, and the like to the transmission unit 307. The radio resource control unit 3011 manages various kinds of configuration information of each terminal apparatus 1.

The subframe configuration unit 3013 included in the higher layer processing unit 301 performs management of the uplink reference UL-DL configuration, the downlink reference UL-DL configuration, and the transmission direction UL-DL configuration on each terminal apparatus 1. The subframe configuration unit 3013 sets the uplink reference UL-DL configuration, the downlink reference UL-DL configuration, and the transmission direction UL-DL configuration for each terminal apparatus 1.

The subframe configuration unit 3013 generates first information indicating the uplink reference UL-DL configuration, second information indicating the downlink reference UL-DL configuration, and third information indicating the transmission direction UL-DL configuration. The subframe configuration unit 3013 transmits the first information, the second information, and the third information to the terminal apparatus 1 via the transmission unit 307.

The base station apparatus 3 may determine the uplink reference UL-DL configuration, the downlink reference UL-DL configuration, and/or the transmission direction UL-DL configuration for the terminal apparatus 1. The base station apparatus 3 may be indicated from a higher node to perform the uplink reference UL-DL configuration, the downlink reference UL-DL configuration, and/or the transmission direction UL-DL configuration for the terminal apparatus 1.

For example, the subframe configuration unit 3013 may determine the uplink reference UL-DL configuration, the downlink reference UL-DL configuration, and/or the transmission direction UL-DL configuration based on an uplink traffic amount and a downlink traffic amount.

The subframe configuration unit 3013 manages at least two subframe sets. The subframe configuration unit 3013 may also set at least two subframe sets for each terminal apparatus 1. The subframe configuration unit 3013 may also set at least two subframe sets for each serving cell. The subframe configuration unit 3013 may also set at least two subframe sets for each CSI process.

The subframe configuration unit 3013 transmits information indicating at least the two subframes sets to the terminal apparatus 1 via the transmission unit 307.

The scheduling unit 3015 included in the higher layer processing unit 301 determines the frequencies and the subframes for allocating the physical channels (the PDSCH and the PUSCH) and the coding rate, modulation scheme, transmit power, and the like of the physical channels (the PDSCH and the PUSCH) from the received channel state information, the estimated value of the channel or the channel quality input from the channel measurement unit 3059, and the like. The scheduling unit 3015 determines whether to schedule the downlink physical channels and/or the downlink physical signals in the flexible subframes or to schedule the uplink physical channels and/or the uplink physical signals. The scheduling unit 3015 generates control information (for example, the DCI format) to control the reception unit 305 and the transmission unit 307 based on the scheduling result and outputs the control information to the control unit 303.

Based on the scheduling result, the scheduling unit 3015 generates information used for the scheduling of the physical channels (the PDSCH and the PUSCH). The scheduling unit 3015 also determines timings at which the transmission process and the reception process are performed based on the uplink reference UL-DL configuration, the downlink reference UL-DL configuration, and/or the transmission direction UL-DL configuration.

The CSI report control unit 3017 included in the higher layer processing unit 301 controls the CSI report of the terminal apparatus 1. The CSI report control unit 3017 transmits information indicating various kinds of settings and assumed for the terminal apparatus 1 to derive the CQI in the CSI reference resource to the terminal apparatus 1 via the transmission unit 307.

Based on the control information from the higher layer processing unit 301, the control unit 303 generates the control signal to control the reception unit 305 and the transmission unit 307. The control unit 303 outputs the generated control signal to the reception unit 305 and the transmission unit 307 to control the reception unit 305 and the transmission unit 307.

The reception unit 305 separates, demodulates, and decodes the received signal received from the terminal apparatus 1 via the transmission/reception antenna 309 according to the control signal input from the control unit 303 and outputs the decoded information to the higher layer processing unit 301. The radio reception unit 3057 converts (downconverts) the uplink signal received via the transmission/reception antenna 309 into a baseband signal through orthogonal demodulation, removes an unnecessary frequency component, controls an amplification level so the signal level is appropriately maintained, performs the orthogonal demodulation based on an in-phase component and a orthogonal component of the received signal, and converts the analog signal subjected to the orthogonal demodulation into a digital signal.

The radio reception unit 3057 removes a portion corresponding to the cyclic prefix (CP) from the converted digital signal. The radio reception unit 3057 performs fast Fourier transform (FFT) on the signal from which the CP is removed to extract a signal of the frequency domain and outputs the extracted signal to the multiplex separation unit 3055.

The multiplex separation unit 1055 separates the signal input from the radio reception unit 3057 into signals such as the PUCCH, the PUSCH, and the uplink reference signal. This separation is determined by the radio resource control unit 3011 of the base station apparatus 3 in advance and is performed based on allocation information of the radio resource included in the uplink grant of which each terminal apparatus 1 is notified. The multiplex separation unit 3055 compensates for the channel of the PUCCH and the PUSCH from the estimated value of the channel input from the channel measurement unit 3059. The multiplex separation unit 3055 outputs the separated uplink reference signals to the channel measurement unit 3059.

The demodulation unit 3053 performs inverse discrete Fourier transform (IDFT) on the PUSCH, acquires the modulation symbols, and demodulates the received signal on each of the modulation symbols of the PUCCH and the PUSCH using a modulation scheme determined in advance, such as binary phase shift keying (BPSK), QPSK, 16 QAM, or 64 QAM, or a modulation scheme of which the base station apparatus notifies each terminal apparatus 1 in advance with the uplink grant. The demodulation unit 3053 separates the modulation symbols of the plurality of pieces of uplink data transmitted with the same PUSCH by using the MIMO SM, based on the number of spatially multiplexed sequences of which each terminal apparatus 1 is notified in advance with the uplink grant and information indicating the precoding performed on the sequence.

The decoding unit 3051 decodes the demodulated coded bits of the PUCCH and the PUSCH at the coding rate which is the coding rate of the coding scheme determined in advance and which is determined in advance or of which the base station apparatus notifies the terminal apparatus 1 in advance with the uplink grant, and then outputs the decoded uplink data and the uplink control information to the higher layer processing unit 101. When the PUSCH is retransmitted, the decoding unit 3051 performs the decoding using the coded bits input from the higher layer processing unit 301 and retained in an HARQ buffer and the demodulated coded bits. The channel measurement unit 3059 measures an estimated value of the channel, the channel quality, and the like from the uplink reference signal input from the multiplex separation unit 3055 and outputs the estimated value, the channel quality, and the like to the multiplex separation unit 3055 and the higher layer processing unit 301.

The transmission unit 307 generates the downlink reference signal according to the control signal input from the control unit 303, codes and modulates the HARQ indicator, the downlink control information, and the downlink data input from the higher layer processing unit 301, multiplexes the PHICH, the PDCCH, the EPDCCH, the PDSCH, and the downlink reference signal, and transmits the multiplexed signals to the terminal apparatus 1 via the transmission/reception antenna 309.

The coding unit 3071 codes the HARQ indicator, the downlink control information, and the downlink data input from the higher layer processing unit 301 using a coding scheme determined in advance, such as block coding, convolution coding, or turbo coding or codes the HARQ indicator, the downlink control information, and the downlink data using the coding scheme determined by the radio resource control unit 3011. The modulation unit 3073 modulates the coded bits input from the coding unit 3071 according to the modulation scheme determined in advance, such as the BPSK, the QPSK, the 16 QAM, or the 64 QAM, or the modulation scheme determined by the radio resource control unit 3011.

The downlink reference signal generation unit 3079 generates the sequence which is obtained according to a rule determined in advance based on the physical cell identifier (PCI) or the like for identifying the base station apparatus 3 and is known by the terminal apparatus 1, as the downlink reference signal. The multiplexing unit 3075 multiplexes the modulated modulation symbol of each channel and the generated downlink reference signal. That is, the multiplexing unit 3075 arranges the modulated modulation symbol of each channel and the generated downlink reference signal in the resource element.

The radio transmission unit 3077 performs inverse fast Fourier transform (IFFT) on the multiplexed modulation symbols, generates the OFDM symbols, adds the CP to the generated OFDM symbols, generates a baseband digital signal, converts the baseband digital signal into an analog signal, removes an excessive frequency component using a lowpass filter, performs upconverting on a carrier frequency, performs power amplification, and outputs the signal to the transmission/reception antenna 309 to transmit the signal.

From the above, the terminal apparatus 1 according to the present invention may have the following characteristics.

(1) The terminal apparatus 1 according to the invention is the terminal apparatus 1 communicating with the base station apparatus 3 and includes: the reception unit 105 that receives the information used to configure the first and second subframe sets, the information indicating whether the delta MCS is enabled, and the downlink control information format (the DCI format) used to schedule the PUSCH; the higher layer processing unit 101 that determines the value of the offset used to determine the number of modulation symbols in regard to the uplink control information transmitted on the PUSCH based on whether the uplink control information sent via the PUSCH with a certain transport block (uplink data) is the initial transmission or the retransmission and whether the transmission on the PUSCH is performed in the first subframe set or the second subframe set; and the transmission unit 107 that configures the value of the beta offset $\beta^{PUSCH}_{offset}$ based on the value of the offset used at the time of the uplink control information sent via the PUSCH with the transport block retransmitted in the same subframe set as the certain subframe set in which the initial transmission of the transport block is performed when the delta MCS is enabled and the uplink control information sent via the PUSCH which does not conform to the transport block in the DCI format is scheduled, and that sets the transmit power for the PUSCH based on the value of the beta offset.

(2) The terminal apparatus 1 according to the invention is the terminal apparatus 1 communicating with the base station apparatus 3 and includes: the reception unit 105 that receives the information indicating whether the delta MCS is enabled and the downlink control information format (the DCI format) used to schedule the PUSCH; the higher layer processing unit 101 that determines the value of the offset used to determine the number of modulation symbols in regard to the uplink control information transmitted on the PUSCH based on the value of the CSI request field included in the DCI format; and the transmission unit 107 that configures the value of the beta offset $\beta^{PUSCH}_{offset}$ based on the value of the beta offset matching the value of the CSI request field when the delta MCS is enabled and the uplink control information sent via the PUSCH without the transport block in the DCI format is scheduled, and that sets transmit power for the PUSCH in which the uplink control information corresponding to the value of the CSI request field is transmitted based on the value of the beta offset.

(3) The terminal apparatus 1 according to the invention is the foregoing terminal apparatus 1 and the higher layer processing unit 101 configures the value of the offset corresponding to the value of the CSI request field based on the information received from the base station apparatus 3.

(4) The terminal apparatus 1 according to the invention is the terminal apparatus 1 communicating with the base station apparatus 3 and includes: the reception unit 105 that receives the information used to configure the first and second subframe sets, the information used to configure the value of the offset in regard to each of the first and second subframe sets, the information indicating whether the delta MCS is enabled, and the downlink control information format used to schedule the PUSCH; the higher layer processing unit 101 that configures the value of the offset in regard to each of the first and second subframe sets when the first and second subframe sets are configured; and the transmission unit 107 that configures the value of the beta offset $\beta^{PUSCH}_{offset}$ based on the value of the offset configured for the first subframe set when the delta MCS is enabled and the transmission on the PUSCH is performed in the subframes belonging to the first subframe set, that configures the value of the beta offset $\beta^{PUSCH}_{offset}$ based on the value of the offsets configured for the second subframe set when the delta MCS is enabled and the transmission on the PUSCH is performed in the subframes belonging to the second subframe set, and that sets the transmit power for the PUSCH based on the value of the beta offset.

(5) The terminal apparatus 1 according to the invention is the foregoing terminal apparatus 1 and the transmission unit 107 configures the predetermined value in the beta offset $\beta^{PUSCH}_{offset}$ when the delta MCS is enabled and the uplink control information sent via the PUSCH with the transport block in the DCI format is scheduled, and sets the transmit power for the PUSCH based on the predetermined value.

(6) The terminal apparatus 1 according to the invention is the foregoing terminal apparatus 1 and the transmission unit 107 sets the transmit power for the PUSCH without consideration of the beta offset when the delta MCS is disabled.

(7) The base station apparatus 3 according to the invention is the base station apparatus 3 communicating with the terminal apparatus 1 and includes: the higher layer processing unit 301 that configures the value of the offset corresponding to the value of the CSI request field; and the transmission unit 307 that transmits the information indicating the value of the offset to the terminal apparatus. The value of the offset is used to determine the number of modulation symbols for the uplink control information transmitted on the PUSCH.

(8) The base station apparatus 3 according to the invention is the base station apparatus 3 communicating with the terminal apparatus 1 and includes: the transmission unit 307 that transmits, to the terminal apparatus 1, the information used to configure the first and second subframe sets, the information used to configure the value of the offset in regard to each of the first and second subframe sets, the information indicating whether the delta MCS is enabled, and the downlink control information format used to schedule the PUSCH.

A program operating in the base station apparatus 3 and the terminal apparatus 1 according to the present invention may be a program (a program enabling a computer to function) controlling a central processing unit (CPU) or the like so that the functions of the foregoing embodiment of the present invention are realized. Information handled in these apparatuses is temporarily stored in a random access memory (RAM) at the time of processing of the information. Thereafter, the information is stored in any of various read-only memories (ROMs) such as a flash ROM or a hard disk drive (HDD), is read by the CPU, as necessary, and is corrected and written.

Parts of the terminal apparatus 1 and the base station apparatus 3 according to the above-described embodiment may be realized in a computer. In this case, a program for realizing the control functions may be recorded in a computer-readable recording medium and the program recorded in the recording medium may be read by a computer system to be executed so that the control functions are realized. The "computer system" mentioned herein refers to a computer system included in the terminal apparatus 1 or the base station apparatus 3 and is assumed to include an OS or hardware such as a peripheral device. The "computer-readable recording medium" refers to a portable medium such as a flexible disk, a magneto-optical disc, a ROM, or a CD-ROM or a storage device such as a hard disk included in the computer system.

Further, the "computer-readable recording medium" may include a communication line that dynamically retains a program in a short time when a program is transmitted via the communication circuit, such as a network such as the Internet or a telephone line and a memory that retains a program for a given time, such as a volatile memory in a computer system serving as a server or a client in that case. The program may be a program that realizes some of the above-described functions or may be a program which further realizes the above-described functions in combination with a program already recorded in the computer system.

The base station apparatus 3 according to the above-described embodiment may be realized as a collective (apparatus group) including a plurality of apparatuses. Each of the apparatuses included in the apparatus group may have each function or some or all of the functional blocks of the base station apparatus 3 according to the above-described embodiment. The apparatus group may have each function or each usual functional block of the base station apparatus 3. The terminal apparatus 1 according to the above-described embodiment may also communicate with the base station apparatus serving as the collective.

The base station apparatus 3 according to the above-described embodiment may be an evolved universal terrestrial radio access network (EUTRAN). The base station apparatus 3 according to the above-described embodiment may have some or all of the functions of a higher node with respect to an eNodeB.

Parts or the entireties of the terminal apparatus 1 and the base station apparatus 3 according to the above-described embodiment may be generally realized as an LSI which is an integrated circuit or may be realized as a chip set. The functional blocks of the terminal apparatus 1 and the base station apparatus 3 may be individually chipped or some or all of the functional blocks may be integrated and chipped. A method of forming an integrated circuit is not limited to an LSI, but a dedicated circuit or a general processor may be realized. When a technology for making integrated circuits in place of the LSI appears with advance in semiconductor technologies, an integrated circuit by this technology can also be used.

In the above-described embodiment, the terminal apparatus has been described as an example of a terminal apparatus or a communication apparatus, but the present invention is not limited thereto. The invention can also be applied to terminal apparatuses or communication apparatuses such as stationary or non-movable type electronic apparatuses installed indoors and outdoors, for example, AV apparatuses, kitchen apparatuses, cleaning and washing apparatuses, air conditioning apparatuses, office apparatuses, vending machines, and other living apparatuses.

The embodiments of the present invention have been described in detail with reference to the drawings, but specific configurations are not limited to the embodiments. Modifications of design within the scope of the present invention without departing from the gist of the present invention are also included. The present invention can be modified in various ways within the scope described in the claims and embodiments obtained by appropriately combining technical means disclosed in other embodiments are also included in the technical scope of the present invention. The elements described in the embodiments and obtaining the same advantageous effects are substituted are also included.

From the above, the present invention may have the following characteristics.

(1) According to a first aspect of the present invention, there is provided a terminal apparatus communicating with a base station apparatus. The terminal apparatus includes: a reception unit that receives information used to configure first and second subframe sets, information indicating whether a delta MCS is enabled, and a downlink control information format (DCI format) used to schedule PUSCH; a higher layer processing unit that determines the value of an offset used to determine the number of modulation symbols in regard to uplink control information transmitted on the PUSCH based on whether the uplink control information sent via the PUSCH with a certain transport block (uplink data) is the initial transmission or retransmission and whether the transmission on the PUSCH is performed in the first subframe set or the second subframe set; and a transmission unit that configures the value of a beta offset $\beta^{PUSCH}_{offset}$ based on the value of the offset used at the time of the uplink control information sent via the PUSCH with the transport block retransmitted in the same subframe set as the certain subframe set in which the initial transmission of the transport block is performed when the delta MCS is enabled and the uplink control information (control data) sent via the PUSCH without the transport block in the DCI format is scheduled, and that sets transmit power for the PUSCH based on the value of the beta offset.

(2) According to a second aspect of the present invention, there is provided a terminal apparatus communicating with a base station apparatus. The terminal apparatus includes: a reception unit that receives information indicating whether a delta MCS is enabled and a downlink control information format (DCI format) used to schedule PUSCH; a higher layer processing unit that determines the value of an offset used to determine the number of modulation symbols in regard to the uplink control information transmitted on the PUSCH based on the value of a CSI request field included in the DCI format; and a transmission unit that configures the value of a beta offset $\beta^{PUSCH}_{offset}$ based on the value of the offset matching the value of the CSI request field when the delta MCS is enabled and the uplink control information sent via the PUSCH without the transport block in the DCI format is scheduled, and that sets transmit power for the PUSCH in which the uplink control information corresponding to the value of the CSI request field is transmitted based on the value of the beta offset.

(3) According to a third aspect of the present invention, in the terminal apparatus according to the second aspect described above, the higher layer processing unit may configure the value of the offset corresponding to the value of the CSI request field based on the information received from the base station apparatus.

(4) According to a fourth aspect of the present invention, there is provided a terminal apparatus communicating with a base station apparatus. The terminal apparatus includes: a reception unit that receives information used to configure the first and second subframe sets, information used to configure the value of an offset in regard to each of the first and second subframe sets, information indicating whether a delta MCS is enabled, and a downlink control information format (DCI format) used to schedule PUSCH; a higher layer processing unit that configures the value of the offset in regard to each of the first and second subframe sets when the first and second subframe sets are configured; and a transmission unit that configures the value of a beta offset $\beta^{PUSCH}_{offset}$ based on the value of the offset configured for the first subframe set when the delta MCS is enabled and the transmission on the PUSCH is performed in subframes belonging to the first subframe set, that configures the value of the beta offset $\beta^{PUSCH}_{offset}$ based on the value of the offsets configured for the second subframe set when the delta MCS is enabled and the transmission on the PUSCH is performed in subframes belonging to the second subframe set, and that sets transmit power for the PUSCH based on the value of the beta offset.

(5) According to a fifth aspect of the present invention, in the terminal apparatus according to any one of the first to fourth aspects described above, the transmission unit may configure the predetermined value in the beta offset $\beta^{PUSCH}_{offset}$ when the delta MCS is enabled and the uplink control information sent via the PUSCH with the transport block in the DCI format is scheduled, and sets the transmit power for the PUSCH based on the predetermined value.

(6) According to a sixth aspect of the present invention, in the terminal apparatus according to any one of the first to fifth aspects described above, the transmission unit may set the transmit power for the PUSCH without consideration of the beta offset when the delta MCS is disabled.

(7) According to a seventh aspect of the present invention, there is provided a base station apparatus communicating a terminal apparatus. The base station apparatus includes a higher layer processing unit that configures the value of an offset corresponding to the value of a CSI request field; and a transmission unit that transmits information indicating the value of the offset to the terminal apparatus. The value of the offset is used to determine the number of modulation symbols for uplink control information transmitted on the PUSCH.

(8) According to an eighth aspect of the present invention, there is provided a base station apparatus communicating with a terminal apparatus. The base station apparatus includes a transmission unit that transmits, to the terminal apparatus, information used to configure the first and second subframe sets, information used to configure the value of an offset in regard to each of the first and second subframe sets, information indicating whether the delta MCS is enabled, and a downlink control information format used to schedule PUSCH.

(9) According to a ninth aspect of the present invention, there is provided a communication method of a terminal apparatus communicating with a base station apparatus. The communication method includes: a step of receiving information used to configure first and second subframe sets, information indicating whether a delta MCS is enabled, and a downlink control information format (DCI format) used to schedule PUSCH; a step of determining the value of an offset used to determine the number of modulation symbols in regard to uplink control information transmitted on the PUSCH based on whether the uplink control information sent via the PUSCH with a certain transport block (uplink data) is the initial transmission or retransmission and whether the transmission on the PUSCH is performed in the first subframe set or the second subframe set; a step of configuring the value of a beta offset $\beta^{PUSCH}_{offset}$ based on the value of the offset used at the time of the uplink control information sent via the PUSCH with the transport block retransmitted in the same subframe set as a certain subframe set in which the initial transmission of the transport block is performed when the delta MCS is enabled and the uplink control information sent via the PUSCH without the transport block in the DCI format is scheduled; and a step of setting transmit power for the PUSCH based on the value of the beta offset.

(10) According to a tenth aspect of the present invention, there is provided a communication method of a terminal apparatus communicating with a base station apparatus. The communication method includes: a step of receiving information indicating whether a delta MCS is enabled and a downlink control information format (DCI format) used to schedule PUSCH; a step of determining the value of an offset used to determine the number of modulation symbols in regard to the uplink control information transmitted on the PUSCH based on the value of a CSI request field included in the DCI format; a step of configuring the value of a beta offset $\beta^{PUSCH}_{offset}$ based on the value of the offset matching the value of the CSI request field when the delta MCS is enabled and the uplink control information sent via the PUSCH without the transport block in the DCI format is scheduled; and a step of setting transmit power for the PUSCH in which the uplink control information corresponding to the value of the CSI request field is transmitted based on the value of the beta offset.

(11) According to an eleventh aspect of the present invention, there is provided a communication method of a terminal apparatus communicating with a base station apparatus. The communication method includes: a step of receiving information used to configure the first and second subframe sets, information used to configure the value of an offset in regard to each of the first and second subframe sets, information indicating whether a delta MCS is enabled, and a downlink control information format (DCI format) used to schedule PUSCH; a step of configuring the value of the offset in regard to each of the first and second subframe sets when the first and second subframe sets are configured; a step of configuring the value of a beta offset $\beta^{PUSCH}_{offset}$ based on the value of the offset configured for the first subframe set when the delta MCS is enabled and the transmission on the PUSCH is performed in subframes belonging to the first subframe set; a step of configuring the value of the beta offset $\beta^{PUSCH}_{offset}$ based on the value of the offsets configured for the second subframe set when the delta MCS is enabled and the transmission on the PUSCH is performed in subframes belonging to the second subframe set; and a step of setting transmit power for the PUSCH based on the value of the beta offset.

(12) According to a twelfth aspect of the present invention, there is provided an integrated circuit mounted on a terminal apparatus communicating with a base station apparatus. The integrated circuit causes the terminal apparatus to fulfill: a function of receiving information used to configure first and second subframe sets, information indicating whether a delta MCS is enabled, and a downlink control information format (DCI format) used to schedule PUSCH; a function of determining the value of an offset used to determine the number of modulation symbols in regard to uplink control information transmitted on the PUSCH based on whether the uplink control information sent via the PUSCH with a certain transport block (uplink data) is the initial transmission or retransmission and whether the transmission on the PUSCH is performed in the first subframe set or the second subframe set; a function of configuring the value of a beta offset $\beta^{PUSCH}_{offset}$ based on the value of the offset used at the time of the uplink control information sent via the PUSCH with the transport block retransmitted in the same subframe set as the certain subframe set in which the initial transmission of the transport block is performed when the delta MCS is enabled and the uplink control information sent via the PUSCH without the transport block in the DCI format is scheduled; and a function of setting transmit power for the PUSCH based on the value of the beta offset.

(13) According to a thirteenth aspect of the present invention, there is provided an integrated circuit mounted on a terminal apparatus communicating with a base station apparatus, an integrated circuit mounted on a terminal apparatus communicating with a base station apparatus. The integrated circuit causes the terminal apparatus to fulfill: a function of receiving information indicating whether a delta MCS is enabled and a downlink control information format (DCI format) used to schedule PUSCH; a function of determining the value of an offset used to determine the number of modulation symbols in regard to the uplink control information sent via the PUSCH based on the value of a CSI request field included in the DCI format; a function of configuring the value of a beta offset $\beta^{PUSCH}_{offset}$ based on the value of the offset matching the value of the CSI request field when the delta MCS is enabled and the uplink control information sent via the PUSCH without the transport block in the DCI format is scheduled; and a function of setting transmit power for the PUSCH in which the uplink control information corresponding to the value of the CSI request field is transmitted based on the value of the beta offset.

(14) According to a fourteenth aspect of the present invention, there is provided an integrated circuit mounted on a terminal apparatus communicating with a base station apparatus. The integrated circuit causes the terminal apparatus to fulfill: a function of receiving information used to configure the first and second subframe sets, information used to configure the value of an offset in regard to each of the first and second subframe sets, information indicating whether a delta MCS is enabled, and a downlink control information format (DCI format) used to schedule PUSCH; a function of configuring the value of the offset in regard to each of the first and second subframe sets when the first and second subframe sets are configured; a function of configuring the value of a beta offset $\beta^{PUSCH}_{offset}$ based on the value of the offset configured for the first subframe set when the delta MCS is enabled and the transmission on the PUSCH is performed in subframes belonging to the first subframe set; a function of configuring the value of the beta offset $\beta^{PUSCH}_{offset}$ based on the value of the offsets configured for the second subframe set when the delta MCS is enabled and the transmission on the PUSCH is performed in subframes belonging to the second subframe set; and a function of setting transmit power for the PUSCH based on the value of the beta offset.

Further, the present invention may have the following characteristics.

(1) According to an aspect of the present invention, there is provided a terminal apparatus which communicates with a base station apparatus, which receives first information indicating that a delta modulation and coding scheme (MCS) is enabled, second information indicating subframes of a first subframe set and subframes of a second subframe set, third information regarding a beta offset, and fourth information regarding the beta offset, and which sets transmit power for a physical uplink shared channel transmission on the basis of the beta offset in a case where the delta MCS is enabled. In regard to control data sent via the physical uplink shared channel without uplink shared channel (UL-SCH) data in the subframes belonging to the first subframe set, a value of the beta offset is based on the third information. In regard to the control data sent via the physical uplink shared channel without the UL-SCH data in the subframes belonging to the second subframe set, the value of the beta offset is based on the fourth information. In regard to the control data sent via the physical uplink shared channel with the UL-SCH data, the value of the beta offset is 1.

(2) In the foregoing terminal apparatus according to the aspect of the present invention, in a case where the subframes of the first subframe set and the subframes of the second subframe set are indicated based on the second information, the third information may be used to determine the number of modulation symbols in regard to the control data sent via the physical uplink shared channel in the subframes belonging to the first subframe set, and the fourth information may be used to determine the number of modulation symbols in regard to the control data sent via the physical uplink shared channel in the subframes belonging to the second subframe set.

(3) According to another aspect of the present invention, there is provided a method used in a terminal apparatus communicating with a base station apparatus. The method comprises: a step of receiving first information indicating that a delta modulation and coding scheme (MCS) is enabled, second information indicating subframes of a first subframe set and subframes of a second subframe set, third information regarding a beta offset, and fourth information regarding the beta offset; a step of setting transmit power for a physical uplink shared channel transmission on the basis of the beta offset in a case where the delta MCS is enabled; a step of configuring a value of the beta offset in regard to control data sent via the physical uplink shared channel without uplink shared channel (UL-SCH) data in the subframes belonging to the first subframe set based on the third information; a step of configuring the value of the beta offset in regard to the control data sent via the physical uplink shared channel without the UL-SCH data in the subframes belonging to the second subframe set on the basis of the fourth information; and a step of configuring 1 as the value of the beta offset in regard to the control data sent via the physical uplink shared channel with the UL-SCH data.

(4) The foregoing method according to the other aspect of the present invention may further comprise, in a case where the subframes of the first subframe set and the subframes of the second subframe set are indicated based on the second information: a step of determining the number of modulation symbols in regard to the control data sent via the physical uplink shared channel in the subframes belonging to the first subframe set on the basis of the third information; and a step of determining the number of modulation symbols in regard to the control data sent via the physical uplink shared channel in the subframes belonging to the second subframe set on the basis of the fourth information.

(5) According to still another aspect of the present invention, there is provided an integrated circuit mounted on a terminal apparatus communicating with a base station apparatus. The integrated circuit causes the terminal apparatus to fulfill a series of functions including: a function of receiving first information indicating that a delta modulation and coding scheme (MCS) is enabled, second information indicating subframes of a first subframe set and subframes of a second subframe set, third information regarding a beta offset, and fourth information regarding the beta offset; a function of setting transmit power for transmission with a physical uplink shared channel based on the beta offset in a case where the delta MCS is enabled; a function of configuring a value of the beta offset in regard to control data sent via the physical uplink shared channel without uplink shared channel (UL-SCH) data in the subframes belonging to the first subframe set on the basis of the third information; a function of configuring the value of the beta offset in regard to the control data sent via the physical uplink shared channel without the UL-SCH data in the subframes belonging to the second subframe set based on the fourth information; and a function of configuring 1 as the value of the beta offset in regard to the control data sent via the physical uplink shared channel with the UL-SCH data.

(6) The foregoing integrated circuit according to the other aspect of the present invention may cause the terminal apparatus to fulfill a series of functions including, in a case where the subframes of the first subframe set and the subframes of the second subframe set are indicated based on the second information: a function of determining the number of modulation symbols in regard to the control data sent via the physical uplink shared channel in the subframes belonging to the first subframe set on the basis of the third information; and, in a case where the subframes of the first subframe set and the subframes of the second subframe set are indicated based on the second information, a function of determining the number of modulation symbols in regard to the control data sent via the physical uplink shared channel in the subframes belonging to the second subframe set on the basis of the fourth information.

Thus, the terminal apparatus can perform the efficient transmit power control.

DESCRIPTION OF REFERENCE NUMERALS 1 (1A, 1B, 1C) TERMINAL APPARATUS
3 BASE STATION APPARATUS
101 HIGHER LAYER PROCESSING UNIT
103 CONTROL UNIT
105 RECEPTION UNIT
107 TRANSMISSION UNIT
109 TRANSMISSION/RECEPTION ANTENNA
301 HIGHER LAYER PROCESSING UNIT
303 CONTROL UNIT
305 RECEPTION UNIT
307 TRANSMISSION UNIT
309 TRANSMISSION/RECEPTION ANTENNA
1011 RADIO SOURCE CONTROL UNIT
1013 SUBFRAME CONFIGURATION UNIT
1015 SCHEDULING INFORMATION INTERPRETATION UNIT
1017 CHANNEL STATE INFORMATION REPORT CONTROL UNIT
1051 DECODING UNIT
1053 DEMODULATION UNIT
1055 MULTIPLEX SEPARATION UNIT
1057 RADIO RECEPTION UNIT
1059 CHANNEL MEASUREMENT UNIT
1071 CODING UNIT
1071a DATA CODING UNIT
1071b NUMBER-OF-MODULATION-SYMBOLS DETERMINATION UNIT
1071c CQI CODING UNIT
1071d DATA CONTROL INFORMATION MULTIPLEXING UNIT
1071e INTERLEAVING UNIT
1073 MODULATION UNIT
1075 MULTIPLEXING UNIT
1077 RADIO TRANSMISSION UNIT
1079 UPLINK REFERENCE SIGNAL GENERATION UNIT
3011 RADIO RESOURCE CONTROL UNIT
3013 SUBFRAME CONFIGURATION UNIT
3015 SCHEDULING UNIT
3017 CHANNEL STATE INFORMATION REPORT CONTROL UNIT
3051 DECODING UNIT
3053 DEMODULATION UNIT
3055 MULTIPLEX SEPARATION UNIT
3057 RADIO RECEPTION UNIT
3059 CHANNEL MEASUREMENT UNIT
3071 CODING UNIT
3073 MODULATION UNIT
3075 MULTIPLEXING UNIT
3077 RADIO TRANSMISSION UNIT
3079 DOWNLINK REFERENCE SIGNAL GENERATION UNIT

The invention claimed is:

1. A terminal apparatus comprising:
reception circuitry configured to receive first information indicating whether or not a delta modulation and coding scheme (MCS) is enabled, second information configuring a first subframe set and a second subframe set, third information regarding a first beta offset, and fourth information regarding the a second beta offset; and
transmission circuitry configured to set a transmit power for a physical uplink shared channel (PUSCH) transmission in a subframe based on the beta offset in a case that the delta MCS is enabled, wherein
a value of the beta offset for control data sent via the PUSCH without uplink shared channel (UL-SCH) data is determined based on the third information, in a case that the subframe belongs to the first subframe set, and
the value of the beta offset is determined based on the fourth information, in a case that the subframe belongs to the second subframe set.

2. The terminal apparatus according to claim 1, wherein
in a case that the first subframe set and the second subframe set are configured based on the second information,
the third information is used for determination of the number of modulation symbols for transmission of the control data sent via the PUSCH in a case that the subframe belongs to the first subframe set, and
the fourth information is used for determination of number of modulation symbols for transmission of the control data sent via the PUSCH in a case that the subframe belongs to the second subframe set.

3. The terminal apparatus according to claim 1, wherein a value of the beta offset for control data sent via the PUSCH with the UL-SCH data is 1.

4. A method for a terminal apparatus, the method comprising:
receiving first information indicating whether or not a delta modulation and coding scheme (MCS) is enabled, second information configuring a first subframe set and a second subframe set, third information regarding a first beta offset, and fourth information regarding a second beta offset;
setting a transmit power for a physical uplink shared channel (PUSCH) transmission in a subframe based on the beta offset in a case that the delta MCS is enabled;
configuring a value of the beta offset for control data sent via the PUSCH without uplink shared channel (UL-SCH) data based on the third information in a case that the subframe belongs to the first subframe set based;
configuring the value of the beta offset based on the fourth information in a case that the subframe belongs to the second subframe set.

5. An integrated circuit to be mounted on a terminal apparatus configured to communicate with a base station apparatus, the integrated circuit causing the terminal apparatus to perform at least functions of:

receiving first information indicating whether or not a delta modulation and coding scheme (MCS) is enabled, second information configuring a first subframe set and a second subframe set, third information regarding a first beta offset, and fourth information regarding a second beta offset;

setting a transmit power for a physical uplink shared channel (PUSCH) transmission in a subframe based on the beta offset in a case that the delta MCS is enabled;

configuring a value of the beta offset for control data sent via the PUSCH without uplink shared channel (UL-SCH) data based on the third information in a case that the subframe belongs to the first subframe set; and configuring the value of the beta offset based on the fourth information in a case that the subframe belongs to the second subframe set.

\* \* \* \* \*